United States Patent
Niina

(10) Patent No.: US 8,019,778 B2
(45) Date of Patent: Sep. 13, 2011

(54) SYSTEM, METHOD, AND APPARATUS FOR SEARCHING INFORMATION ACROSS DISTRIBUTED DATABASES

(75) Inventor: Hiroshi Niina, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 391 days.

(21) Appl. No.: 12/046,022

(22) Filed: Mar. 11, 2008

(65) Prior Publication Data

US 2009/0019007 A1    Jan. 15, 2009

(30) Foreign Application Priority Data

Mar. 28, 2007   (JP) ................................ 2007-085979

(51) Int. Cl.
 *G06F 7/00*    (2006.01)
 *G06F 17/30*   (2006.01)
(52) U.S. Cl. ...................................................... 707/770
(58) Field of Classification Search ........................ None
 See application file for complete search history.

(56) References Cited

FOREIGN PATENT DOCUMENTS

| | | |
|---|---|---|
| JP | 04-319744 | 11/1992 |
| JP | 2002-175327 | 6/2002 |
| JP | 2007-034827 | 2/2007 |

OTHER PUBLICATIONS

Ozsu & Valduriez, Principles of Distributed Database Systems, Chapter 13.3.3, Parallel Database Systems, Printice Hall, 1999.

Decision of a Patent Grant for JP2007-085979 mailed on Jun. 30, 2009.

Kido, et al. An Evaluation of a Scheme for Parallel Processing of XML Data using PC Clusters. DBSJ Letters 2006. vol. 5, No. 2, pp. 85-88.

TX1 XML Database Realizing High-Speed Searches in Large-Scale Environments. Toshiba Review 2005. vol. 60, No. 7, pp. 71-75.

*Primary Examiner* — Kavita Padmanabhan
(74) *Attorney, Agent, or Firm* — Turocy & Watson, LLP

(57) ABSTRACT

A master node includes a locality determining table that stores data structures of obtained items, types of conditions that the items should meet, and locality information; a plan generating unit that generates a search plan; a determining unit that obtains the locality information corresponding to the data structure of the item obtained as a sequence and the type of condition for the item and determines whether the item is stored in a distributed manner across different databases; an updating unit that removes a request of creating a logical sequence from the search plan and updates the search plan when the item is not stored in a distributed manner across the different databases; and an execution requestexecution requesting unit that notifies a slave node of a search plan execution request. The slave node includes an execution request receiving unit and an executing unit that executes the search plan.

9 Claims, 30 Drawing Sheets

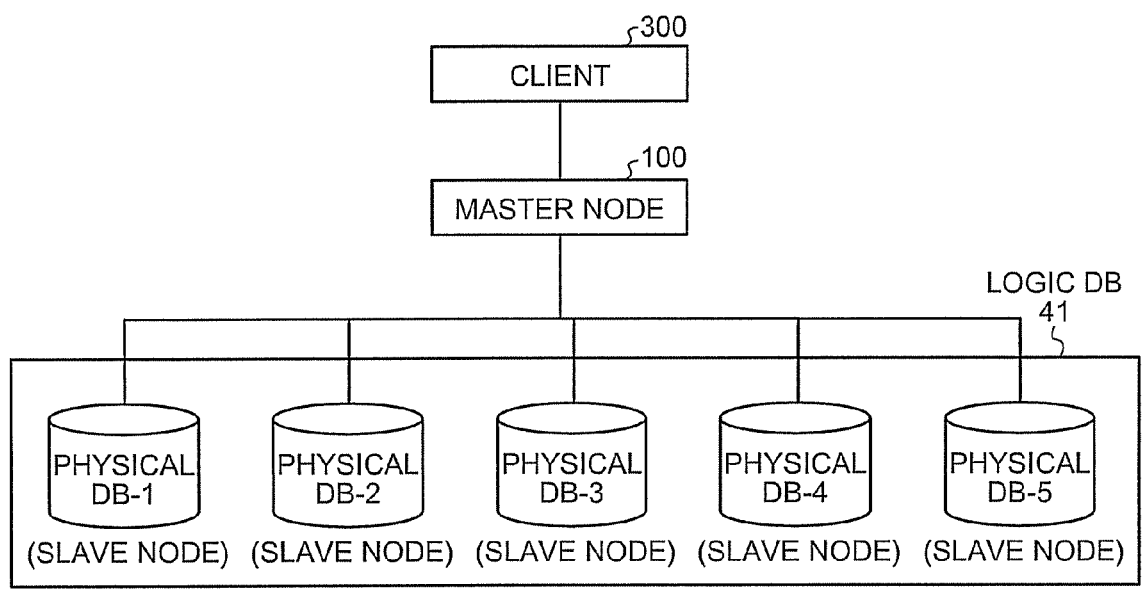

FIG.6

```
<person @id="...">
    <name>...</name>
    <address>...</address>
    <emailaddress>...</emailaddress>
    <phone>...</phone>
    <profile>
        <gender></gender>
        <age></age>
        <interest @category="..."></interest>
    </profile>
    <watch @category="..."/>
</>
```

FIG.7

```
<deal @id="..." @seller="..." @buyer="...">
    <item @category="...">
        <name>....</name>
        <payment>...</payment>
        <shipping>...</shipping>
        <description>....</description>
    </item>
    <related @category="..."></related >
    <price></price>
    <date></date>
    <annotation>...</annotation>
</deal>
```

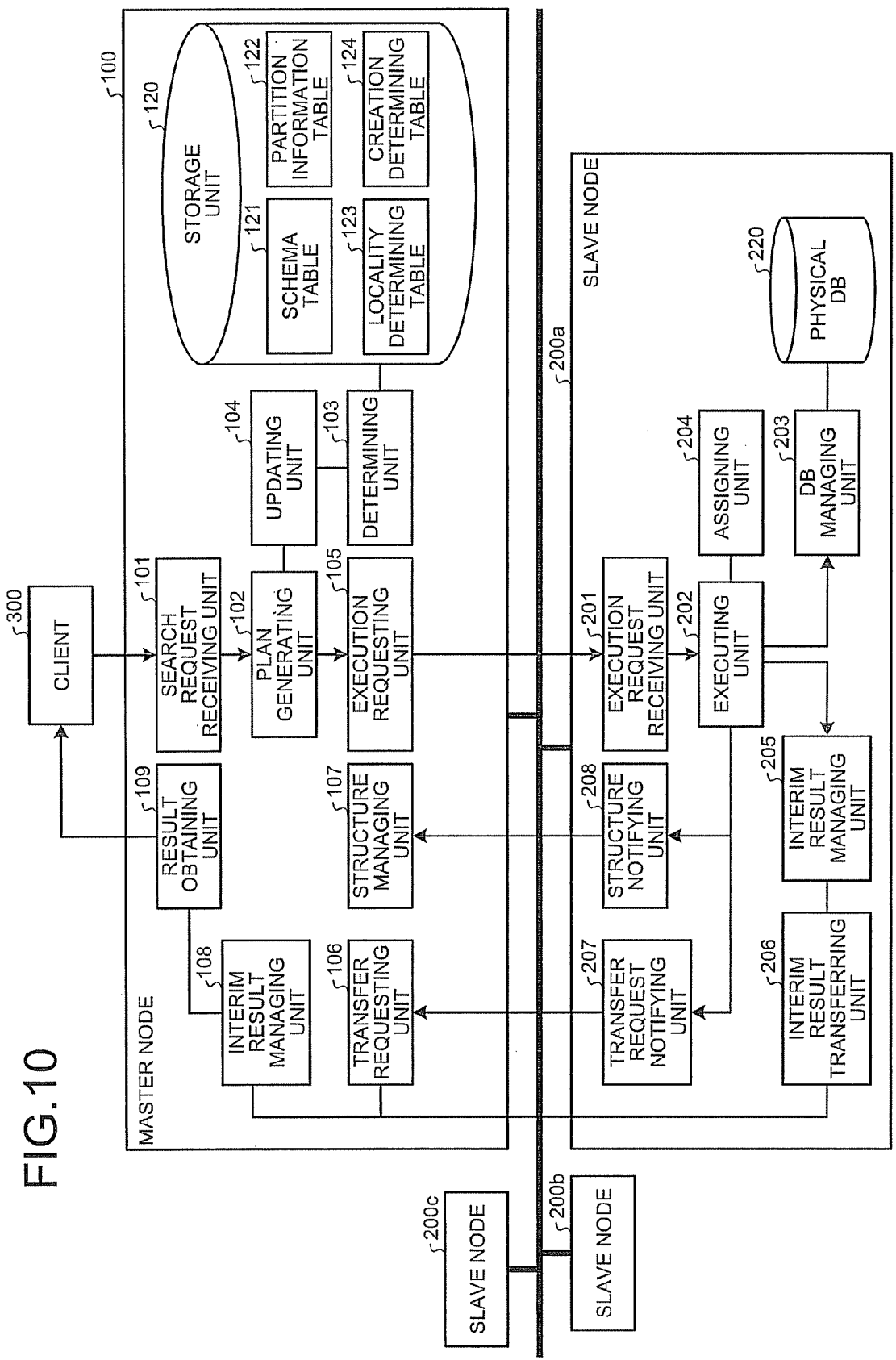

FIG.11

| ITEM | DATA TYPE | UNIQUENESS INFORMATION |
|---|---|---|
| /person/@id | ID | UNIQUE TYPE |
| /person/name | CHARACTER STRING | NON-UNIQUE TYPE |
| /person/address | CHARACTER STRING | NON-UNIQUE TYPE |
| /person/emailaddress | CHARACTER STRING | NON-UNIQUE TYPE |
| /person/phone | CHARACTER STRING | NON-UNIQUE TYPE |
| /person/profile/gender | CHARACTER STRING | NON-UNIQUE TYPE |
| /person/profile/age | NONNEGATIVE INTEGER | NON-UNIQUE TYPE |
| /person/profile/interest/@category | POSITIVE INTEGER | NON-UNIQUE TYPE |
| /person/watch/@category | POSITIVE INTEGER | NON-UNIQUE TYPE |

FIG.12

| ITEM | DATA TYPE | UNIQUENESS INFORMATION |
|---|---|---|
| /deal/@id | ID | UNIQUE TYPE |
| /deal/@seller | IDREF | NON-UNIQUE TYPE |
| /deal/@buyer | IDREF | NON-UNIQUE TYPE |
| /deal /item/@category | POSITIVE INTEGER | NON-UNIQUE TYPE |
| /deal /item/name | CHARACTER STRING | NON-UNIQUE TYPE |
| /deal /item/payment | CHARACTER STRING | NON-UNIQUE TYPE |
| /deal /item/shipping | CHARACTER STRING | NON-UNIQUE TYPE |
| /deal /item/description | CHARACTER STRING | NON-UNIQUE TYPE |
| /deal/related/@category | POSITIVE INTEGER | NON-UNIQUE TYPE |
| /deal/price | FLOATING POINT NUMBER | NON-UNIQUE TYPE |
| /deal/date | DATE | NON-UNIQUE TYPE |
| /deal/annotation | CHARACTER STRING | NON-UNIQUE TYPE |

FIG.13

| SLAVE NODE ID | PARTITIONING CRITERION |
|---|---|
| 1 | /person/@id≦10000 |
| 2 | /person/@id>10000 |

| SLAVE NODE ID | PARTITIONING CRITERION |
|---|---|
| 3 | /deal/@id≦10000 |
| 4 | /dea/@id>10000 |

```
for $x in db("auctions")/deal[item/@category="12345"]/related/@category
let $a :=db("people")/person[profile/interest/@category=$x]/@id
let $b :=db("auctions")/deal[@buyer=$a]
return $b
```

FIG.17

| | CONDITION VALUE TYPE: SINGLE CONSTANT | CONDITION VALUE TYPE: SINGLE VARIABLE | CONDITION VALUE TYPE: SEQUENCE CONSTANT | CONDITION VALUE TYPE: SEQUENCE VARIABLE |
|---|---|---|---|---|
| DATA ATTRIBUTE: UNIQUE TYPE & RANGE-PARTITION TARGET | LOCALITY INFORMATION: PRESENT | LOCALITY INFORMATION: PRESENT | LOCALITY INFORMATION: PRESENT/LOCALITY INFORMATION: ABSENT | LOCALITY INFORMATION: UNCERTAIN |
| DATA ATTRIBUTE: NON-UNIQUE TYPE & RANGE-PARTITION TARGET | LOCALITY INFORMATION: PRESENT | LOCALITY INFORMATION: PRESENT | LOCALITY INFORMATION: PRESENT/LOCALITY INFORMATION: ABSENT | LOCALITY INFORMATION: UNCERTAIN |
| DATA ATTRIBUTE: UNIQUE TYPE & NON-RANGE-PARTITION TARGET | LOCALITY INFORMATION: PRESENT | LOCALITY INFORMATION: PRESENT | LOCALITY INFORMATION: ABSENT | LOCALITY INFORMATION: ABSENT |
| DATA ATTRIBUTE: NON-UNIQUE TYPE & NON-RANGE-PARTITION TARGET | LOCALITY INFORMATION: ABSENT | LOCALITY INFORMATION: ABSENT | LOCALITY INFORMATION: ABSENT | LOCALITY INFORMATION: ABSENT |

FIG.18

|  | LOCALITY INFORMATION: PRESENT | LOCALITY INFORMATION: UNCERTAIN | LOCALITY INFORMATION: ABSENT |
|---|---|---|---|
| USAGE INFORMATION: REFERENCE SEQUENCE | DO NOT CREATE LOGICAL SEQUENCE MANAGEMENT INFORMATION | DO NOT CREATE LOGICAL SEQUENCE MANAGEMENT INFORMATION | DO NOT CREATE LOGICAL SEQUENCE MANAGEMENT INFORMATION |
| USAGE INFORMATION: OUTPUT SEQUENCE | DO NOT CREATE LOGICAL SEQUENCE MANAGEMENT INFORMATION | DETERMINE BY INDIVIDUALLY REFERRING TO CONDITION VALUES DURING SEARCH PROCESS | CREATE LOGICAL SEQUENCE MANAGEMENT INFORMATION |

FIG.19

FIG.20

| TRANSFER-REQUESTED SLAVE NODE INFORMATION | 3 |
|---|---|
| RECEIVER SLAVE NODE INFORMATION | 1 |
| INTERIM RESULT ID | BT2 |

FIG.21

| LOGICAL SEQUENCE ID | PARTIAL SEQUENCE ID | SLAVE NODE ID | INTERIM RESULT ID | KEY ID |
|---|---|---|---|---|
| 10 | 10110 | 3 | 1004 | 111 |

FIG.22

| SLAVE NODE ID | INTERIM RESULT ID | COLUMN NUMBER | RECORD NUMBER | LOCALITY SEQUENCE FLAG |
|---|---|---|---|---|
| 3 | 3 | 4 | 1 | 1 |

FIG.23

| INPUT-SIDE SLAVE NODE ID | INPUT-SIDE INTERIM RESULT ID | INPUT-SIDE INTERIM RESULT RECORD NUMBER |
|---|---|---|
| 1 | 1 | 1 |

FIG.24

| INPUT INTERIM RESULT | EXECUTION OPERATOR | EXECUTABILITY INFORMATION |
|---|---|---|
| --- | createTable | 1 |
| BT1 | select | 0 |
| BT100 | scanAncestor | 0 |
| BT101 | scanDescendant | 0 |
| BT2 | notify | 0 |
| --- | request | 1 |
| BT3 | Join | 0 |
| BT300 | scanAncestor | 0 |
| BT301 | sequence | 0 |
| BT0 | registSequence | 0 |

| INPUT INTERIM RESULT | EXECUTION OPERATOR | EXECUTABILITY INFORMATION |
|---|---|---|
| --- | request | 1 |
| BT2 | Join | 0 |
| BT200 | scanAncestor | 0 |
| BT201 | scanDescendant | 0 |
| BT202 | sequence | 0 |
| BT3 | notify | 0 |

| CREATED INTERIM RESULT |
|---|
| BT1 |
| BT100 |
| BT101 |
| ... |
| ... |

FIG.29

| col1 |
|------|
| "12345" |

SLAVE 1   BT1

FIG.30

| col1 | category |
|------|----------|
| "12345" | 001 |
| "12345" | 002 |

SLAVE 1   BT100

FIG.31

| category | deal |
|----------|------|
| 001 | 003 |
| 002 | 004 |

SLAVE 1   BT101

FIG.32

| deal | category2 |
|------|-----------|
| 003 | 005 |
| 003 | 006 |
| 004 | 007 |
| 004 | 008 |

SLAVE 1   BT2

FIG.33

| col1 |
|------|
| "12345" |

SLAVE 2   BT1

FIG.34

| col1 | category |
|------|----------|
| "12345" | 101 |
| "12345" | 102 |

SLAVE 2   BT100

FIG.35

| category | deal |
|---|---|
| 101 | 103 |
| 102 | 104 |

SLAVE 2   BT101

FIG.36

| deal | category2 |
|---|---|
| 103 | 105 |
| 103 | 106 |
| 104 | 107 |
| 104 | 108 |

SLAVE 2   BT2

FIG.37

| deal | category2 |
|---|---|
| 003 | 005 |
| 003 | 006 |
| 004 | 007 |
| 004 | 008 |
| 103 | 105 |
| 103 | 106 |
| 104 | 107 |
| 104 | 108 |

SLAVE 3   BT2

FIG.38

| KEY ID | category2 | category3 |
|---|---|---|
| 121 | 005 | 201 |
| 122 | 006 | -- |
| 123 | 007 | 202 |
| 123 | 007 | 203 |
| 124 | 008 | -- |
| 221 | 105 | -- |
| 222 | 106 | 204 |
| 222 | 106 | 205 |
| 223 | 107 | -- |
| 224 | 108 | -- |

SLAVE 3   BT200

FIG.39

| KEY ID | category2 | category3 | person |
|---|---|---|---|
| 121 | 005 | 201 | 206 |
| 123 | 007 | 202 | 207 |
| 123 | 007 | 203 | 208 |
| 222 | 106 | 204 | 209 |
| 222 | 106 | 205 | 210 |

SLAVE 3  BT201

FIG.40

| KEY ID | category2 | person | id |
|---|---|---|---|
| 121 | 005 | 206 | 211 |
| 123 | 006 | 207 | 212 |
| 123 | 007 | 208 | 213 |
| 222 | 007 | 209 | 214 |
| 222 | 008 | 210 | 215 |

SLAVE 3  BT202

FIG.41

| KEY ID | category2 | S(id) |
|---|---|---|
| 111 | 005 | 33411 |
| 113 | 007 | 33421 |
| 222 | 106 | 33431 |

SLAVE 3   BT3

FIG.42

| S(id) | id |
|---|---|
| 33411 | 211 |
| 33421 | 212 |
| 33421 | 213 |
| 33431 | 214 |
| 33431 | 215 |

SLAVE 3   BT1002

FIG.43

| KEY ID | category2 | category3 |
|---|---|---|
| 121 | 005 | 301 |
| 122 | 006 | 302 |
| 123 | 007 | 303 |
| 124 | 008 | -- |
| 221 | 105 | -- |
| 222 | 106 | -- |
| 223 | 107 | -- |
| 224 | 108 | -- |

SLAVE 4   BT200

FIG.44

| KEY ID | category2 | category3 | person |
|---|---|---|---|
| 121 | 005 | 301 | 304 |
| 122 | 006 | 302 | 305 |
| 123 | 007 | 303 | 306 |

SLAVE 4   BT201

FIG.45

| KEY ID | category2 | person | id |
|---|---|---|---|
| 121 | 005 | 301 | 307 |
| 122 | 006 | 302 | 308 |
| 123 | 007 | 303 | 309 |

SLAVE 4   BT202

FIG.46

| KEY ID | category2 | S(id) |
|---|---|---|
| 111 | 005 | 43411 |
| 112 | 006 | 43421 |
| 113 | 007 | 43431 |

SLAVE 4   BT3

FIG.47

| S(id) | id |
|---|---|
| 43411 | 307 |
| 43421 | 308 |
| 43431 | 309 |

SLAVE 4   BT1002

FIG.48

| KEY ID | category2 | S(id) |
|---|---|---|
| 111 | 005 | 33411 |
| 113 | 007 | 33421 |
| 222 | 106 | 33431 |
| 111 | 005 | 43411 |
| 112 | 006 | 43421 |
| 113 | 007 | 43431 |

SLAVE 1   BT3

FIG.49

| KEY ID | S(id) | buyer |
|---|---|---|
| 111 | 33411 | 401 |
| 111 | 33411 | 402 |
| 112 | 33421 | 403 |
| 222 | 33431 | 404 |
| 111 | 43411 | 405 |
| 112 | 43421 | -- |
| 113 | 43431 | -- |

SLAVE 1   BT300

FIG.50

| KEY ID | S(id) | buyer | deal |
|---|---|---|---|
| 111 | 33411 | 401 | 406 |
| 111 | 33411 | 402 | 407 |
| 112 | 33421 | 403 | 408 |
| 222 | 33431 | 404 | 409 |
| 111 | 43411 | 405 | 410 |

SLAVE 1   BT301

FIG.51

| KEY ID | S(deal) |
|---|---|
| 111 | 10110 |
| 113 | 10120 |
| 222 | 10130 |

SLAVE 1  BT0

FIG.52

| S(deal) | deal |
|---|---|
| 10110 | 406 |
| 10110 | 407 |
| 10120 | 410 |
| 10120 | 408 |
| 10130 | 409 |

SLAVE 1  BT1004

FIG.53

| LOGICAL SEQUENCE ID | PARTIAL SEQUENCE ID | SLAVE NODE ID | INTERIM RESULT ID | KEY ID |
|---|---|---|---|---|
| 1 | 10110 | 1 | 1004 | 111 |
| 1 | 20110 | 2 | 1004 | 111 |
| 2 | 10120 | 3 | 1004 | 113 |
| 2 | 20130 | 2 | 1004 | 113 |
| 3 | 10130 | 1 | 1004 | 222 |
| 4 | 20120 | 2 | 1004 | 112 |

FIG.54

| KEY ID | S(id) | buyer |
|---|---|---|
| 111 | 33411 | 501 |
| 111 | 33411 | 502 |
| 112 | 33421 | 503 |
| 222 | 33431 | -- |
| 111 | 43411 | -- |
| 112 | 43421 | 504 |
| 113 | 43431 | 505 |
| 113 | 43431 | 506 |

SLAVE 2   BT300

FIG.55

| KEY ID | S(id) | buyer | deal |
|---|---|---|---|
| 111 | 33411 | 501 | 507 |
| 111 | 33411 | 502 | 508 |
| 112 | 33421 | 503 | 509 |
| 112 | 43421 | 504 | 510 |
| 113 | 43431 | 505 | 511 |
| 113 | 43431 | 506 | 512 |

SLAVE 2   BT301

FIG.56

| KEY ID | S(deal) |
|---|---|
| 111 | 20110 |
| 112 | 20120 |
| 113 | 20130 |

SLAVE 2   BT0

FIG.57

| S(deal) | deal |
|---|---|
| 20110 | 507 |
| 20120 | 510 |
| 20130 | 509 |
| 20130 | 511 |
| 20130 | 512 |

SLAVE 2   BT1004

FIG.58

| S(deal) |
|---|
| 10110 |
| 10120 |
| 10130 |

SLAVE 1   BT0

FIG.59

| S(deal) |
|---|
| 20110 |
| 20120 |
| 20130 |

SLAVE 2   BT0

FIG.60

| S(deal) |
|---|
| 10110 |
| 10120 |
| 10130 |
| 20110 |
| 20120 |
| 20130 |

MASTER BT0

FIG.61

| LOGICAL SEQUENCE ID | PARTIAL SEQUENCE ID | SLAVE NODE ID | INTERIM RESULT ID |
|---|---|---|---|
| 1 | 10110 | 1 | 1004 |
| 1 | 10120 | 2 | 1004 |

FIG.62

| S(deal) | deal |
|---|---|
| 1 | 406 |
| 1 | 407 |
| 1 | 410 |

MASTER BT1006

| S(deal) | deal |
|---------|------|
| 1 | 507 |

MASTER BT1007

| S(deal) | deal |
|---------|------|
| 1 | 406 |
| 1 | 407 |
| 1 | 410 |
| 1 | 507 |

MASTER BT1008

```
for $x in db("auction")/deal[item/@category="12345"]/related/@category
let $a:=db("people")/person[profile/interest/@category=$x]/@id
return $a
```

FIG.67 createTable@(Slave1, Slave2):->BT1
|
select@(Slave1, Slave2):->BT100
|
scanAncesrtor@(Slave1, Slave2):->BT101
|
scanDescendant@(Slave1, Slave2):->BT2
|
notify(BT2)@(Slave1, Slave2)     request(BT2)@(Slave3, Slave4):->BT2
                \                /
Join@(Slave3, Slave4):->BT200
|
scanAncestor@(Slave3, Slave4):->BT201
|
scanDescendant@(Slave3, Slave4):->BT202
\
sequence@(Slave3, Slave4):->BT3

FIG.68

| category2 | S(id) |
|---|---|
| 005 | 33411 |
| 007 | 33421 |
| 106 | 33431 |

SLAVE 3   BT3

FIG.69

| category2 | S(id) |
|---|---|
| 005 | 43411 |
| 006 | 43421 |
| 007 | 43431 |

SLAVE 4   BT3

FIG.70

| category2 | S(id) |
|---|---|
| 005 | 33411 |
| 007 | 33421 |
| 106 | 33431 |
| 005 | 43411 |
| 006 | 43421 |
| 007 | 43431 |

MASTER  BT3

FIG.71

| S(id) | id |
|---|---|
| 33411 | 211 |
| 33421 | 212 |
| 33421 | 213 |
| 33431 | 214 |
| 33431 | 215 |

SLAVE 3  BT1002

FIG.72

| S(id) | id |
|---|---|
| 43411 | 307 |
| 43421 | 308 |
| 43431 | 309 |

SLAVE 4  BT1002

FIG.73

| S(id) | id |
|---|---|
| 33411 | 211 |

MASTER  BT1004

| KEY ID | category2 | person | id |
|---|---|---|---|
| 121 | 005 | 206 | 211 |
| 123 | 006 | 207 | 212 |
| 123 | 007 | 208 | 213 |
| 222 | 007 | 209 | 214 |
| 222 | 008 | 210 | 215 |
| 121 | 005 | 301 | 307 |
| 122 | 006 | 302 | 308 |
| 123 | 007 | 303 | 309 |

BT202

| category2 | person | id |
|---|---|---|
| 005 | 206 | 211 |
| 005 | 301 | 307 |
| 006 | 207 | 212 |
| 006 | 302 | 308 |
| 007 | 208 | 213 |
| 007 | 209 | 214 |
| 007 | 303 | 309 |
| 008 | 210 | 215 |

SEQUENCE PORTIONS OBTAINED WHEN "category2" COLUMN VALUE IS "005"

SEQUENCE PORTIONS OBTAINED WHEN "category2" COLUMN VALUE IS "006"

SEQUENCE PORTIONS OBTAINED WHEN "category2" COLUMN VALUE IS "007"

SEQUENCE PORTIONS OBTAINED WHEN "category2" COLUMN VALUE IS "008"

SYSTEM, METHOD, AND APPARATUS FOR SEARCHING INFORMATION ACROSS DISTRIBUTED DATABASES

CROSS-REFERENCE TO RELATED APPLICATIONS

This application is based upon and claims the benefit of priority from the prior Japanese Patent Application No. 2007-85979, filed on Mar. 28, 2007; the entire contents of which are incorporated herein by reference.

BACKGROUND OF THE INVENTION

1. Field of the Invention

The present invention relates to a system, a method, and an apparatus for conducting a search in accordance with given criteria across horizontally-divided distributed databases in which a number of data items are divided into clusters in such a manner as to each have a certain number of data items, and each of the clusters is entered and processed in one of the databases connected via a network.

2. Description of the Related Art

Recent technological advancement has realized a structured text database in which structured text information described in a language such as the Extensible Markup Language (XML) is stored and searched for. In most cases, a query language called XQuery (XML Query) that is being standardized by the W3C (World Wide Web Consortium) is used to make an inquiry to the structured text database.

Unlike the Structured Query Language (SQL), which is a standard query language for a relational database (RDB) designed for data management in a table format, the XQuery search process targeted at XML data deals with list-structured sequence data as an interim result.

Meanwhile, a horizontally-divided distributed database system is well known, in which a number of data items are divided into clusters so that each cluster has the same number of items, and each of the clusters is entered and processed in one of the databases connected to one another via a network. When a search is conducted on such a distributed database system by use of XQuery, sequence data that serves as an interim result may be scattered as partial results (partial sequences) across different databases (physical DBs). Therefore, the partial sequences need to be dealt with as a logical sequence in which the partial sequences are logically integrated.

For an object database, a data management technology is known to manage structures similar to that of a logical sequence composed of partial sequences (as can be seen in Japanese Patent No. 2827562). In this technology, an ID is assigned to each independent partial set, and a set of assigned IDs is prepared. Then, an ID is assigned to the prepared set, and thereby management information hierarchically including sets of sets is obtained to manage the structures.

However, in the logical sequence management according to a method as suggested by Japanese Patent No. 2827562, management information needs to be referred to every time when forming or referring to a sequence, or conducting any other sequence-related operation in general. That is, excess overhead is produced from a process related to partial sequences, which is unnecessary when a single database is targeted at.

SUMMARY OF THE INVENTION

According to one aspect of the present invention, a searching system includes a plurality of information managing apparatuses that individually manage a plurality of databases that store in a distributed manner plural types of information each of which includes at least one item; and a searching apparatus that searches for the information from the information managing apparatuses, the plurality of information managing apparatuses and the searching apparatus being connected to one another by way of a network.

The searching apparatus includes: a search request receiving unit that receives a search request including a condition that the item should meet; a locality storing unit that stores a data structure of the database related to the item, a type of the condition, and locality information indicating whether the item obtained as sequence information in a list structure is distributed across the databases, in association with one another; a plan generating unit that analyzes the search request received by the search request receiving unit, and generates a search plan that is a processing request to the database, including a request of obtaining the sequence information and a request of creating a logical sequence by merging the sequence information obtained from the databases; a determining unit that obtains from the locality storing unit the locality information that corresponds to the data structure of the database related to the item and the type of the condition that the item should meet, for each item obtained as the sequence information, and determines whether the item obtained as the sequence information is distributed across the databases in accordance with the obtained locality information; an updating unit that removes the request of creating the logical sequence from the search plan and thereby updates the search plan, when the determining unit determines that the item is not distributed across the databases; an execution requestexecution requesting unit that sends an execution request of the search plan updated by the updating unit to the information managing apparatuses; and a result obtaining unit that receives an execution result of the search plan from the information managing apparatuses as a search result.

Each of the information managing apparatuses includes: the databases; an execution request receiving unit that receives the execution request from the searching apparatus; and an executing unit that executes the search plan on the databases in accordance with the execution request received by the execution request receiving unit.

According to another aspect of the present invention, a searching method is performed in a searching system that includes a plurality of information managing apparatuses that individually manage a plurality of databases that store in a distributed manner plural types of information each of which includes at least one item, and a searching apparatus that searches for the information across the information managing apparatuses, the plurality of information managing apparatuses and the searching apparatus being connected to one another by way of a network.

The searching method comprising: storing by the searching apparatus in a locality storing unit, a data structure of a database related to the item, a type of the condition, and locality information indicating whether the item obtained as sequence information in a list structure is distributed across the databases, in association with one another; receiving a search request by the searching apparatus; analyzing the received search request by the searching apparatus; generating by the searching apparatus a search plan that is a processing request to the database, including a request of obtaining the sequence information and a request of creating a logical sequence by merging the sequence information obtained from the databases; obtaining by the searching apparatus from the locality storing unit the locality information that corresponds to the data structure of the database related to the item and the type of the condition that the item should meet, for each item obtained as the sequence information; determining by the searching apparatus whether the item obtained as the sequence information is distributed across the databases in accordance with the obtained locality information; removing by the searching apparatus the request of creating the logical sequence from the search plan and thereby updating the search plan when the searching apparatus determines that the item is not distributed across the databases; sending an execution request of the updated search plan to the information managing apparatuses by the searching apparatus; receiving the execution request from the searching apparatus by the information managing apparatuses; and executing the search plan on the databases in accordance with the received execution request by the information managing apparatuses.

According to still another aspect of the present invention, a searching apparatus that is connected to a plurality of information managing apparatuses by way of a network and searches for the information across the information managing apparatuses that individually manage a plurality of databases that store in a distributed manner plural types of information each of which includes at least one item.

The searching apparatus includes a search request receiving unit that receives a search request including a condition that the item should meet; a locality storing unit that stores a data structure of a database related to the item, a type of the condition, and locality information indicating whether the item obtained as sequence information in a list structure is distributed across the databases, in association with one another; a plan generating unit that analyzes the search request received by the search request receiving unit, and generates a search plan that is a processing request to the database, including a request of obtaining the sequence information and a request of creating a logical sequence by merging the sequence information obtained from the databases; a determining unit that obtains from the locality storing unit the locality information that corresponds to the data structure of the database related to the item and the type of the condition that the item should meet, for each item obtained as the sequence information, and determines whether the item obtained as the sequence information is distributed across the databases in accordance with the obtained locality information; an updating unit that removes the request of creating the logical sequence from the search plan and thereby updates the search plan, when the determining unit determines that the item is not distributed across the databases; and an execution requestexecution requesting unit that sends an execution request of the search plan updated by the updating unit to the information managing apparatuses.

BRIEF DESCRIPTION OF THE DRAWINGS

FIG. 1 is an explanatory diagram for showing an example of a structure of a searching system according to an embodiment of the present invention;

FIG. 2 is an explanatory diagram for showing an example of an input search formula;

FIG. 6 is an explanatory diagram for showing an example of a data format of information stored in a logic DB;

FIG. 7 is an explanatory diagram for showing an example of a data format of information stored in another logic DB;

FIG. 10 is a block diagram for showing the structure of a master node and slave nodes in detail according to the embodiment;

FIG. 11 is an explanatory diagram for showing an example of a data structure of schema information for information stored in a schema table;

FIG. 12 is an explanatory diagram for showing an example of a data structure of schema information for information stored in another schema table;

FIG. 13 is an explanatory diagram for showing an example of a data structure of partition information;

FIG. 14 is an explanatory diagram for showing an example of a data structure of partition information;

FIG. 15 is an explanatory diagram for showing an example of a search formula;

FIG. 17 is an explanatory diagram for showing an example of a data structure of a locality determining table;

FIG. 18 is an explanatory diagram for showing an example of a data structure of a creation determining table;

FIG. 19 is an explanatory diagram for showing an example of an updated search plan;

FIG. 20 is an explanatory diagram for showing an example of a data structure of a request for transferring an interim result;

FIG. 21 is an explanatory diagram for showing an example of a data structure of logical sequence management information;

FIG. 22 is an explanatory diagram for showing an example of a data structure of a sequence ID;

FIG. 23 is an explanatory diagram for showing an example of a data structure of a key ID;

FIG. 24 is an explanatory diagram for showing an example of a data structure of an executability table;

FIGS. 29 to 52 are explanatory diagrams of an interim result;

FIG. 53 is an explanatory diagram for showing an example of logical sequence management information;

FIGS. 54 to 60 are explanatory diagrams of an interim result;

FIG. 61 is an explanatory diagram for showing an example of logical sequence management information;

FIGS. 62 to 64 are explanatory diagrams of an interim result;

FIG. 65 is an explanatory diagram for showing an example of a search formula;

FIG. 66 is an explanatory diagram for showing an example of a search plan;

FIG. 67 is an explanatory diagram for showing an example of a modified search plan;

FIGS. 68 to 74 are explanatory diagrams of an interim result;

FIG. 75 is an explanatory diagram for showing an example of logical sequence management information.

DETAILED DESCRIPTION OF THE INVENTION

Exemplary embodiments of a system, an apparatus, and a method of searching for information across distributed databases according to the present invention are explained below in detail with reference to the attached drawings.

The searching system according to an embodiment is configured to determine whether a sequence obtained through a search across distributed databases is stored in a single physical DB and whether such a sequence is output as a search result, and to optimize, when either one of the conditions is met, the search plan by omitting a process of structuring a logical sequence.

The form of expressing a sequence that is dealt with in the search process across the distributed databases is first explained with reference to FIGS. 1 to 4. As indicated in FIG. 1, the searching system includes a client 300, a master node 100, and a plurality of slave nodes.

The client 300 is constituted by an ordinary personal computer (PC) or the like and transmits a search request for information stored in slave nodes to the master node 100.

The master node 100 is a searching apparatus that conducts a search for the information across the slave nodes, in response to the search request from the client 300. Detailed description on the master node 100 will be provided later.

Slave nodes are information managing apparatuses that conduct management in a distributed manner of the databases maintaining horizontally divided data and a data search in response to a request from the master node 100, and send the search result back to the master node 100. In the example of FIG. 1, a logic DB 41 is formed by the physical DBs of five slave nodes, but the structure of the logic DB is not limited thereto. Furthermore, the searching system may include more than one logic DB.

A network that connects the master node 100, the slave nodes, and the client 300 to one another may be any form of network, such as the Internet and a VPN.

The search formula indicated in FIG. 2 shows a search request expressed in XQuery format. It is assumed in this search formula that the logic DB 41 of FIG. 1 is a database "people" maintaining user information, and that, in addition to the logic DB 41, there is another logic DB, "auctions", maintaining auction-related information that is not shown in FIG. 1.

Figure 3:
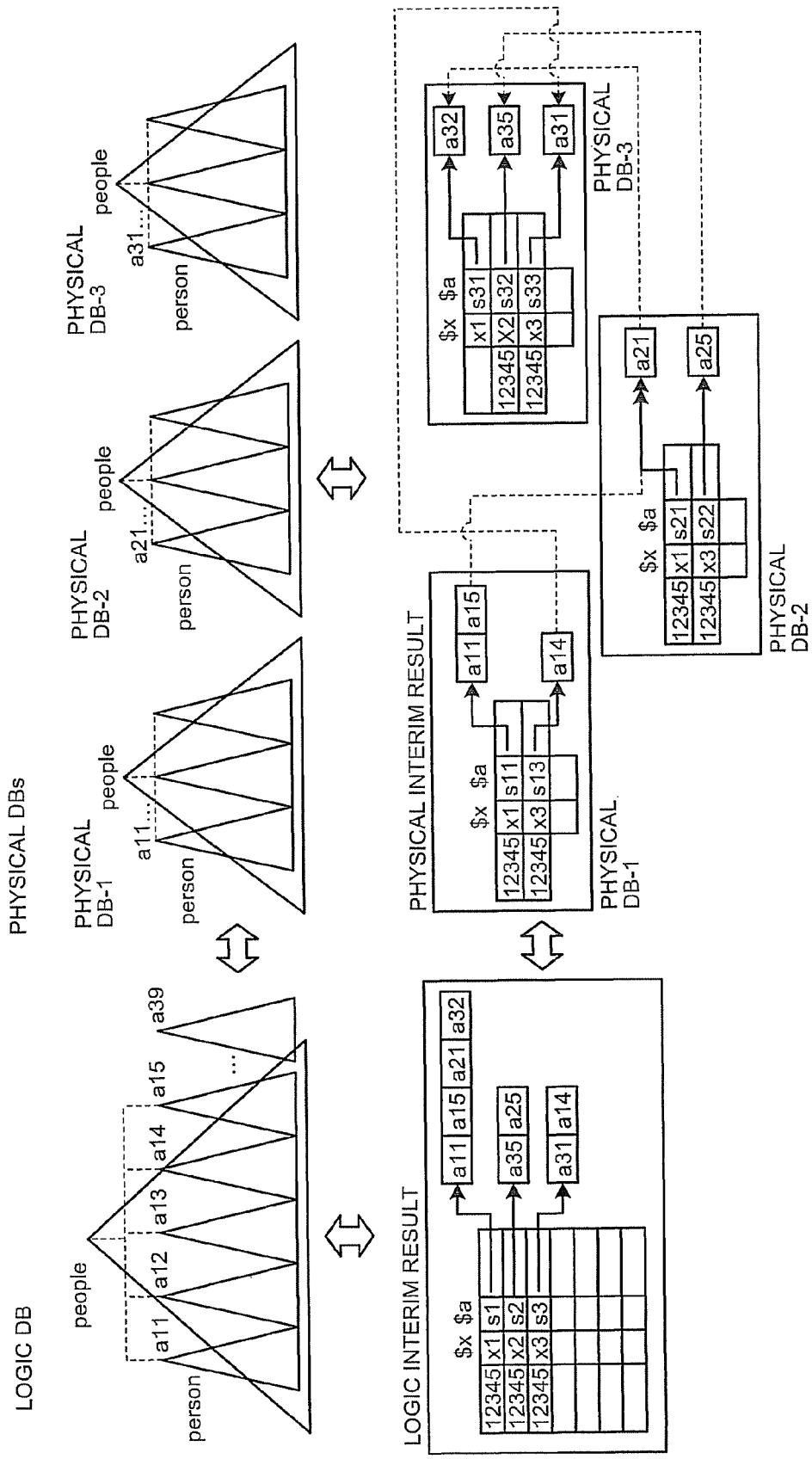
FIG. 3 is an explanatory diagram for showing an example of a form of expressing a sequence.

FIG. 3 is an explanatory diagram for showing an example of a form of expressing a sequence that is obtained from a search process by use of a search formula as indicated in FIG. 2. In FIG. 3, each of a physical DB-1, a physical DB-2, and a physical DB-3 stores therein user data (person) that is designated as a1$n$, a2$n$, and a3$n$ (where n is an integer), respectively.

In such a structure, an interim result that is expressed by a single sequence in a logic DB may correspond to several partial sequences that are stored in different physical DBs. In FIG. 3, for instance, the sequence "a11, a15, a21, a32" corresponding to sequence ID=s1 is a combination of a sequence "a11, a15" of the physical DB-1 (sequence ID=s11), a sequence "a21" of the physical DB-2 (sequence ID=s21), and a sequence "a32" of the physical DB-3 (sequence ID=s31).

Figure 4:
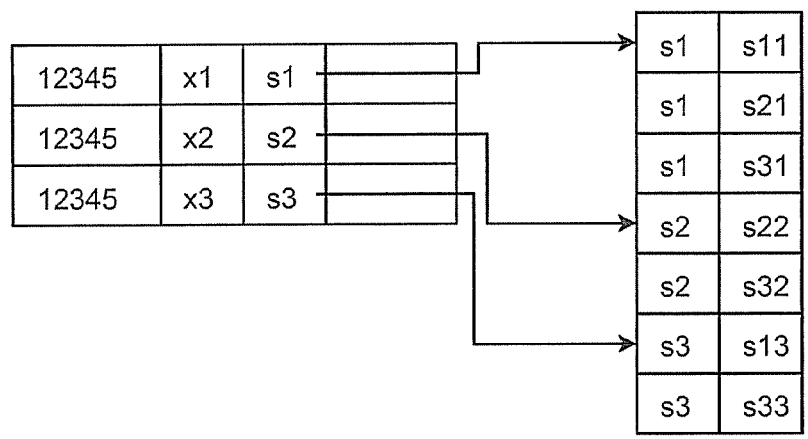
FIG. 4 is an explanatory diagram for showing an example of logical sequence management information.

In such a case, management information (hereinafter, logical sequence management information) needs to be generated to handle the scattered sequences as a single logical sequence. In FIG. 4, an example of logical sequence management information associating sequence IDs for each physical DB with logical sequence IDs is presented. With such logical sequence management information, for example, sequences that correspond to sequence IDs=s11, s21, and s31 are not separately dealt with, but as a single sequence that is identified by sequence ID=s1.

In general, when distributed databases execute a process onto a search criterion the result of which would form a list-form data structure (sequences), fragments of the result appear on different slave nodes that constitute the distributed databases. It is then necessary to manage combination information for list-form data items of the result that are logically to be combined among scattered list-form data items and produce a list-form logical data structure to execute a process.

There is a situation, however, in which such handling can be avoided. According to the present embodiment, a search plan is optimized by determining whether the handling is necessary based on a given search criterion, schema information, and DB partition information. This eliminates unnecessary processing overhead in a distributed database environment where the search result data already has a list-form data structure.

Figure 5:
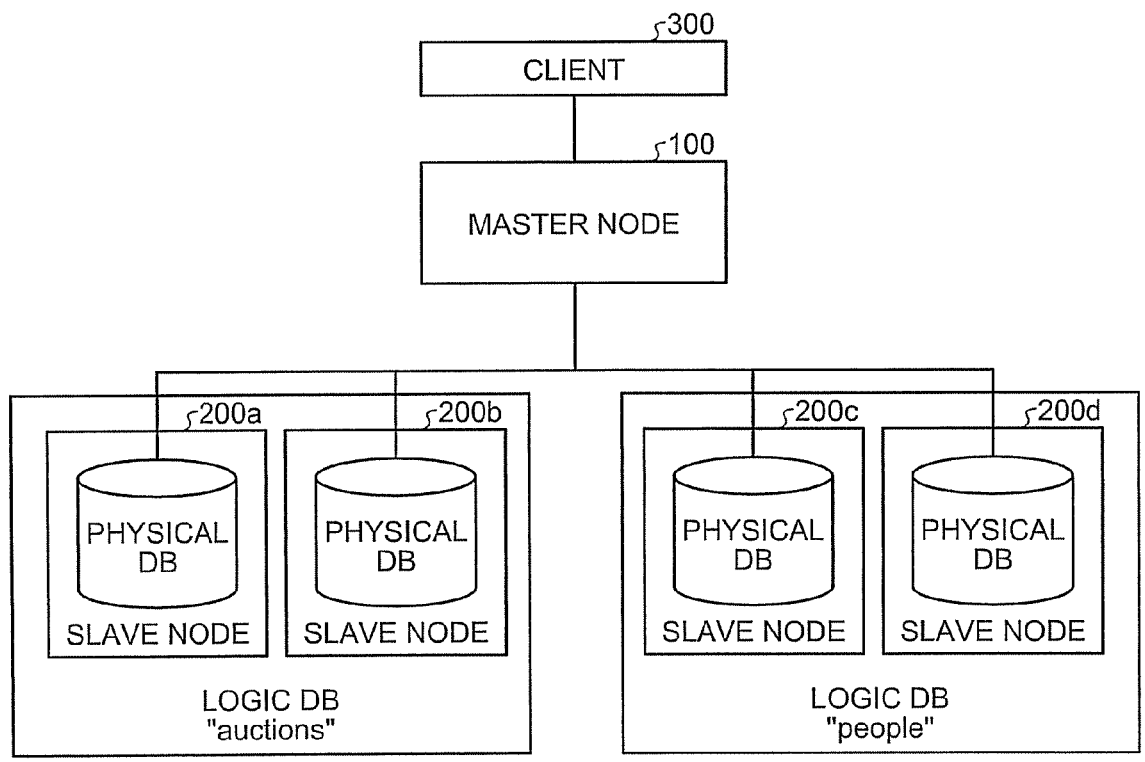
FIG. 5 is an explanatory diagram for showing an another example of the structure of the searching system according to the embodiment.

The structures of the master node 100 and the slave nodes are now explained in detail with reference to FIGS. 5 to 14. In the structures of FIG. 5 and subsequent drawings, a searching system that includes two logic DBs, "auctions" and "people", each constituted by two physical DBs is used as an example. The DB structure is not limited thereto, however. A logic DB may include three physical DBs or more, or a searching system may include three logic DBs or more.

As shown in FIG. 5, the searching system according to the embodiment includes the client 300, the master node 100, and slave nodes 200$a$, 200$b$, 200$c$, and 200$d$. The master node 100 and the client 300 have the same structures as those in FIG. 1, and thus are provided with the same reference numerals. The explanation on those components is therefore omitted. The slave nodes 200$a$, 200$b$, 200$c$, and 200$d$ hold different information in their individual physical DBs, but have the same structure. Hereinafter, they may be simply referred to as slave nodes 200.

FIGS. 6 and 7 are explanatory diagrams showing examples of data formats of information stored in the logic DBs "people" and "auctions", respectively. As shown in these drawings, it is assumed below that the information is stored in XML format.

Figure 8:
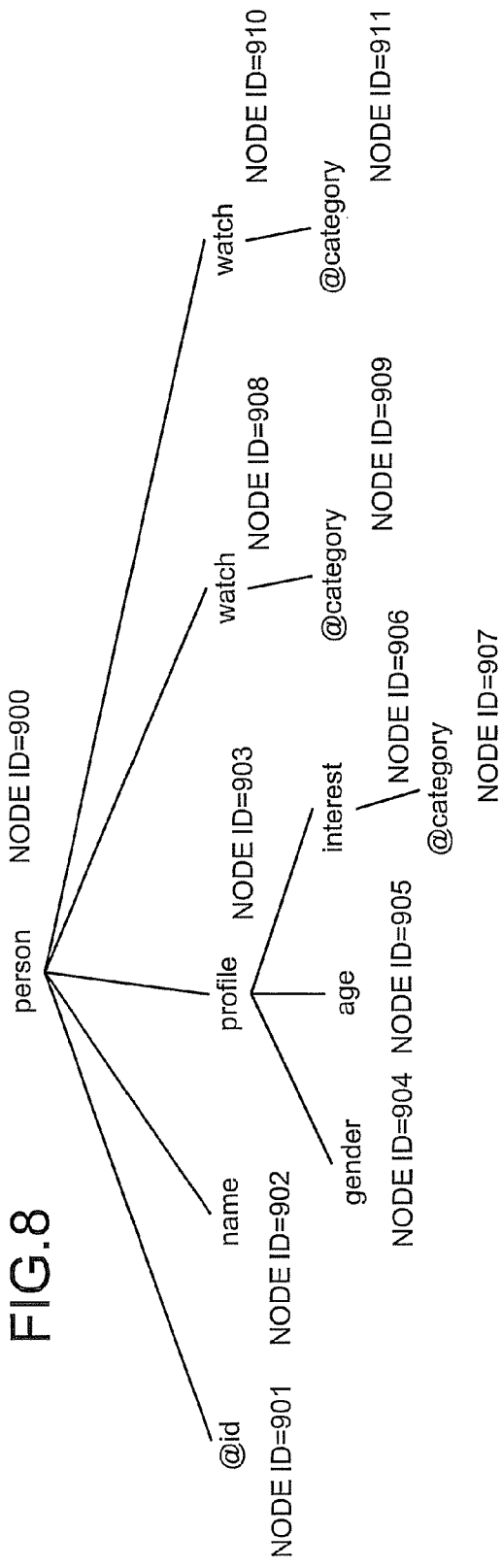
FIG. 8 is an explanatory diagram for showing an example of XML data in a tree structure.
Figure 9:
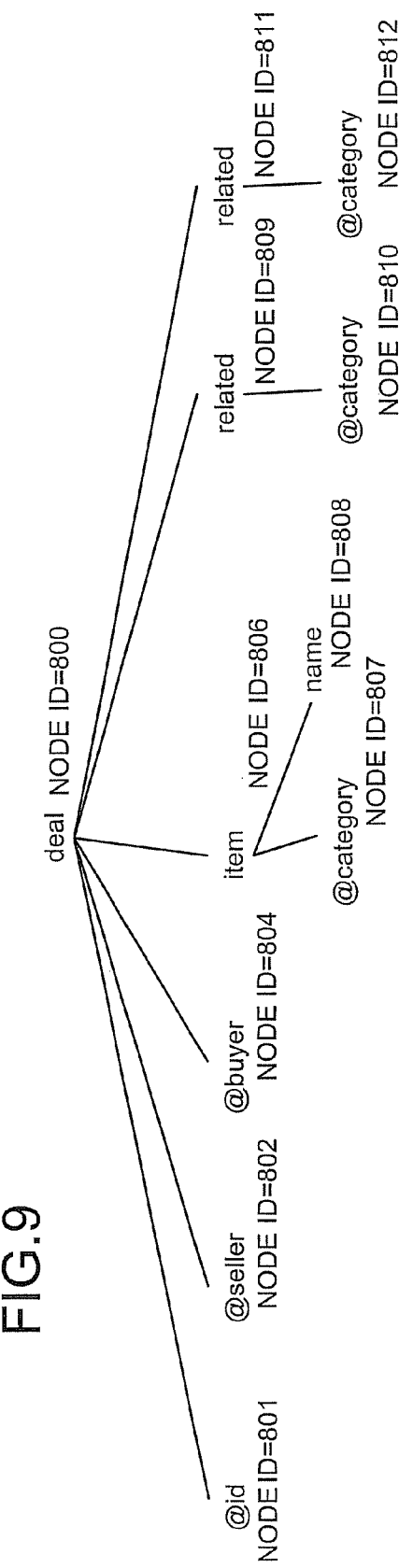
FIG. 9 is an explanatory diagram for showing an example of XML data in a tree structure.

The XML-format information (XML data) can be expressed in a tree structure using tags and attributes as nodes. FIG. 8 is a diagram of data "person" stored in the database "people". FIG. 9 is a diagram of data "deal" in the database "auctions".

Each node in the tree structure of data in any database is given a node ID to manage the data. A node indicating a tag "person" is positioned at the root of the tree and given a node ID 900. This node ID is unique in the database "people". Even when multiple "person" data items are stored in the database, the target "person" data can be identified by specifying this node ID.

As indicated in FIG. 8, there are two items of the same attribute "/person/watch/@category" (a "category" attribute placed immediately under "watch" tags, which are slave nodes immediately under the "person" tag) in the "person" data. However, each item can be identified by the node ID that is assigned to each node. In the XML data search, a string of operators is executed on the stored data to obtain the node ID of a node such as a tag or an attribute that matches the criteria from among the stored data. An operator here means a unit of operation that is executed in the process of finding a search result.

As illustrated in FIG. 10, the master node 100 includes a storage unit 120, a search request receiving unit 101, a plan generating unit 102, a determining unit 103, an updating unit 104, an execution requestexecution requesting unit 105, a transfer requesting unit 106, a structure managing unit 107, an interim result managing unit 108, and a result obtaining unit 109.

The storage unit 120 stores therein various tables that are referred to in the search process. In particular, a schema table 121, a partition information table 122, a locality determining table 123, and a creation determining table 124 are stored in the storage unit 120.

The schema table 121 stores therein schema information that determines the data structure of the information stored in a physical DB 220 of the slave node 200 (explained later). As shown in FIGS. 11 and 12, the schema table 121 associates items of the information stored in the physical DB 220 with types of data and uniqueness information.

Types of data include, for example, an ID type, a character string type, a nonnegative integer type, and a positive integer type as information that determines a form of a value that each item can assume. The uniqueness information indicates whether the item assumes a unique value in the logic database. In other words, when the item assumes a unique value, "unique type" is entered, or otherwise "non-unique type" is entered.

FIGS. 11 and 12 are diagrams of the schema information for the information stored in the databases "people" and "auctions", respectively.

In the structure of FIG. 10, the partition information table 122 stores therein partition information that specifies partitioning criteria for determining which physical DB 220 to store information. FIGS. 13 and 14 are explanatory diagrams showing examples of data structures of the partition information. The partition information on the databases "people" and "auctions" is described in FIGS. 13 and 14, respectively.

For instance, the database "people" shown in FIG. 13 specifies partitioning criteria for determining the physical DB 220 to store information based on the determination as to whether the value of a unique-type item "/person/@id" is greater than a predetermined threshold. In a similar manner, the database "auctions" shown in FIG. 14 specifies partitioning criteria for determining the physical DB 220 to store information based on the determination as to whether the value of a unique-type item "/deal/@id" is greater than a predetermined threshold.

A slave node ID is information for identifying the slave node 200 in which target information is stored. In the following, it is assumed that the slave node IDs of the slave nodes 200a, 200b, 200c, and 200d are 1, 2, 3, and 4, respectively.

The locality determining table 123 stores therein rules for determining locality information that indicates whether the sequence obtained in the search process is scattered in multiple physical DBs 220. The creation determining table 124 stores therein rules for determining whether to create logical sequence management information.

The locality determining table 123 and the creation determining table 124 are referred to when the determining unit 103 that is discussed later determines whether to create the logical sequence management information. Thus, these two tables will be described in detail along with the functions of the determining unit 103.

The storage unit 120 may be formed by any memory medium that is generally used, such as a hard disk drive (HDD), an optical disk, a memory card, and a random access memory (RAM).

The search request receiving unit 101 in FIG. 10 receives a search request transmitted by the client 300. According to the present embodiment, the search request receiving unit 101 receives an XQuery search formula as the search request.

The search formula in FIG. 15 represents an operation of retrieving auction data (deal) on an item (item) of an item category number "12345", further retrieving IDs (@id) of users who are interested in item categories related to the auction item (related/@category) in a collective manner for each category, and outputting auction data (deal) of items bought by the users.

The plan generating unit 102 generates a search plan to execute a search process with reference to the search formula received by the search request receiving unit 101 and the partition information table 122. More specifically, the plan generating unit 102 generates a search plan showing operators, dependency relation in data exchange among the operators, and assignment of the operators to the slave nodes 200.

Figure 16:
FIG. 16 is an explanatory diagram for showing an example of a search plan.

FIG. 16 is a diagram for showing an example of a search plan generated in correspondence with a search formula as indicated in FIG. 15. At this point, because it has not yet been determined whether the logical sequence management information needs to be created, two "registSequence" operators for registering the logical sequence management information are included.

Expressions such as "createTable" represent the names of operators. As for a portion that comes after the operator, "Slave1", for example, represents an operator executed at the slave node 200 of the slave node ID=1. Portions starting with "BT" such as "BT0" represent interim result IDs that identify the interim results. Finally, the symbol "->" indicates that, as a result of the execution of the operator, the interim result identified by the interim result ID indicated on the right side of the symbol is output.

The determining unit 103 determines whether the logical sequence management information should be created, by referring to the locality determining table 123 and the creation determining table 124. In the determining process of the determining unit 103, locality information and usage information are included.

The locality information indicates whether a sequence is scattered across different physical DBs 220, as discussed above. In other words, the locality information shows whether a sequence obtained at the slave node 200 is to be combined with sequences obtained at other slave node 200s into a logical sequence. The usage information indicates whether the sequences obtained during the search process should be referred to as a single logical sequence.

The process of obtaining the locality information is first explained. The determining unit 103 makes a determination on the locality information by referring to the locality determining table 123. First, the determining unit 103 acquires the data attribute and the type of condition value from the obtained sequence.

The data attribute is an attribute of an item obtained as a sequence. Data attributes include uniqueness information of an item (unique or non-unique type), and information indicating whether the item is referred to as a criterion of judgment as to whether to store information in different physical DBs 220 (range-partition target or non-range-partition target). The uniqueness information can be acquired from the schema table 121 indicated in FIGS. 11 and 12. A range-partition target or non-range-partition target can be determined by referring to the partitioning criteria of the partition information table 122 indicated in FIGS. 13 and 14.

The type of condition value represents a type of criterion that a sequence should meet among search criteria. The type of condition value depends on the condition value being a constant or a variable, and also a single value or a sequence value, and thus there are four possible types, a "single constant", a "single variable", a "sequence constant", and a "sequence variable".

Whether the condition value is a constant or a variable can be determined by analyzing the search formula. For instance, the condition value "12345" in the first line of the search formula of FIG. 15 is determined as a constant. The condition value "$x" in the second line is determined as a variable defined in the first line.

Furthermore, the determining unit 103 determines whether the condition value is a single value or a sequence value. More specifically, when the condition value is a constant, the determining unit 103 determines whether the constant is a single value or a sequence value by analyzing the search formula. Moreover, when the condition value is a variable, the determining unit 103 traces back the point where the condition value is created in the search formula to see whether the variable indicates a sequence value.

Next, the determining unit 103 obtains the locality information that correspond to the data attribute and the type of condition value that are found out from the locality determining table 123 as shown in FIG. 17, and makes determination on the locality information. The locality information determination is made as follows, in accordance with the combination of the data attribute and the type of condition value.

(1) Determine that locality information is present:

(a) when the data attribute is of the "unique type" or a "range-partition target" and the type of condition value is a "single value"; or (b) when the data attribute is a "range-partition target", the type of condition value is a "sequence constant", and the value of this sequence is included in a single slave node when referring to the DB partition information.

(2) Determine that the locality information is uncertain (in such a case, the determination on the locality information has to be made by individually judging the condition values during the search process):

(a) when the data attribute is a "range-partition target", and the type of condition value is a "sequence variable".

(3) Determine that there is no locality information (where no locality information means that whether the information is scattered across several physical DBs 220 cannot be determined in accordance with the condition values):

(a) when the data attribute is of the "non-unique type" and a "non-range-partition target";

(b) when the data attribute is of the "unique type", and the type of condition value is a "sequence"; or (c) when the data attribute is a "range-partition target", the type of condition value is a "sequence constant", and the value included in the sequence extends across multiple slave nodes 200 in accordance with the DB partition information.

The process of obtaining the usage information is now described. The dependency relation of the interim results in an XQuery search formula is expressed as exchanges of variables. In FIG. 15, for example, "$x" and "$a" are provided as interim results in the search formula, where the dependency relation of "$x" and "$a" is expressed by the formula in the second line.

The determining unit 103 traces back the exchange relationship and determines that the usage information is an output sequence (1) when sequences created in the search become part of the final output result of the search formula. The determining unit 103 determines that the usage information is a reference sequence (2) when the sequences do not become part of the final output result of the search formula.

In the example of FIG. 15, one of the created sequences, "$b", is the final output result of the search formula as can be seen from the bottom line, "return $b". Thus, the determining unit 103 determines that the usage information is an output sequence. On the other hand, "$a" is not a sequence output in the "return" formula, and thus the determining unit 103 determines that the usage information is a reference sequence.

In this manner, the determining unit 103 acquires the locality information and the usage information. Then, the determining unit 103 determines whether logical sequence management information should be created by comparing the locality information and the usage information with the creation determining table 124 as indicated in FIG. 18. The determining unit 103 determines whether to create logical sequence management information based on a combination of the usage information and the locality information as follows:

(1) Determine that the logical sequence management information should not be created:

(a) when the usage information is a "reference sequence"; or (b) when the usage information is an "output sequence", and locality information is present.

(2) Determine that whether to create logical sequence management information should be determined during the search process by individually referring to the condition values:

(a) when the usage information is an "output sequence", and the locality information in the search criterion is uncertain.

(3) Determine that the logical sequence management information should be created:

(a) when the usage information is an "output sequence", and there is no locality information.

In the structure of FIG. 10, the updating unit 104 prepares a search plan that does not include an operator of registering logical sequence management information ("registSequence" operator) for a sequence for which the determining unit 103 has determined not to create logical sequence management information, and updates the already generated search plan.

FIG. 19 is a diagram for showing an example of a search plan from which the "registSequence" operator regarding the sequence "$a" that is first obtained from the search formula in FIG. 15 is removed in accordance with the result obtained by the determining unit 103.

As described above, when logical sequence management information does not need to be created, the updating unit 104 can optimize the search plan by omitting the process of creating this information. Thus, excess overhead of the search process can be reduced.

The execution requestexecution requesting unit 105 sends a search plan to the slave node 200 to request the execution of the search plan.

The transfer requesting unit 106 determines, when receiving a request of transferring an interim result from the slave node 200, whether the transfer request is executable, and notifies the transfer-requested slave node 200 of the transfer request. More specifically, the transfer requesting unit 106 receives a request of transferring the interim result from a transfer request notifying unit 207 (described later) of the slave node 200 and stores it in the storage unit 120 or the like.

The transfer requesting unit 106 also receives an interim result preparation notification from the slave node 200 and stores it therein.

The interim result transfer request indicated in FIG. 20 includes transfer-requested slave node information that identifies the transfer-requested slave node 200, receiver slave node information that identifies a receiver slave node 200, and an interim result ID that identifies the interim result that is to be transferred.

The structure managing unit 107 receives and manages the logical sequence management information including the sequence ID of each slave node 200 from a structure notifying unit 208 (described later) of the slave node 200.

The logical sequence management information indicated in FIG. 21 includes the logical sequence ID that uniquely identifies the logical sequence, a partial sequence ID, the slave node ID of the slave node 200 that has created the sequence ID, the interim result ID, and a key ID. The interim result ID is identification information for identifying the interim result in which the values for the elements of the sequence are stored.

The partial sequence ID is a physical sequence ID that is created for each slave node 200. The partial sequence ID in FIG. 22 has a data structure in which the slave node ID of the slave node 200 that creates the sequence, the interim result ID, a column number that identifies a column in the interim result, a record number that identifies a record of the interim result, and a locality sequence flag are brought into association.

The locality sequence flag indicates whether the sequence is stored in a scattering manner. The locality sequence flag is set to "1" when the locality information is present according to the determination made by the determining unit 103, while the locality sequence flag is set to "0" when there is no locality information.

The key ID is key information used when grouping physical sequences to form a logical sequence. The key ID in FIG. 23 has a data structure in which the slave node ID of the slave node 200 that inputs the interim result, the interim result ID of the interim result on the input side, and a record number of the interim result on the input side are brought into association.

The interim result managing unit 108 receives the interim results transferred by an interim result transferring unit 206 of each slave node 200, and manages the interim results by storing them in a not-shown memory medium such as a RAM.

The result obtaining unit 109 obtains entity data of the sequence from each slave node 200 as the search result, based on the interim results that is output in the end, and transmits the data to the client 300.

The slave node 200 is now described. As shown in FIG. 10, the slave node 200 includes the physical DB 220, an execution request receiving unit 201, an executing unit 202, a DB managing unit 203, an assigning unit 204, an interim result managing unit 205, an interim result transferring unit 206, the transfer request notifying unit 207, and the structure notifying unit 208.

The physical DB 220 is a memory medium for recording documents that are horizontally divided. According to the embodiment, the physical DB 220 stores therein XML-formatted files, as described with reference to FIGS. 6 to 9. The physical DB 220 may be formed with any type of memory medium that is generally used, such as a HDD, an optical disk, a memory card, and a RAM.

The execution request receiving unit 201 receives a request for executing a search plan from the master node 100. The execution request includes a search plan that should be executed.

The executing unit 202 implements the requested search plan, in accordance with the execution request received by the execution request receiving unit 201. The executing unit 202 first creates an executability table based on the search plan. The executability table defines conditions for the state of the interim result that should be met to execute the operators described in the search plan, in accordance with the dependency relation of the inputting and outputting of the operators that are described in the search plan.

Figures 25, 26:
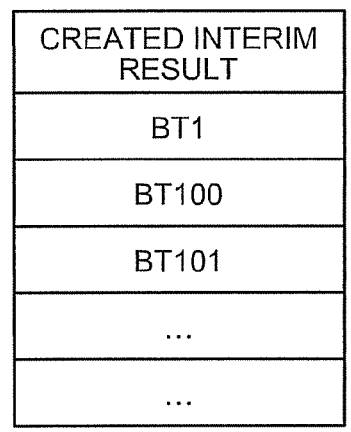
FIG. 25 is an explanatory diagram for showing an example of a data structure of another executability table.
FIG. 26 is an explanatory diagram for showing an example of a data structure of an interim result preparation state table.

FIG. 24 is a diagram for showing an example of an executability table created by the slave nodes 200 of slave node IDs=1 and 2 in response to the search plan as indicated in FIG. 19. FIG. 25 is a diagram for showing an example of an executability table created the slave nodes 200 of slave node IDs=3 and 4 in response to the search plan as indicated in FIG. 19.

In particular, the executability table stores therein input interim results indicating interim results that are to be input, executable operators that can be implemented when an input interim result is input, executability information that indicates whether the operators are executable, in association with one another. In other words, the executability table describes the interim result that serves as a precondition for implementing each operator. The input interim result of an operator showing "---" indicates that no interim result is needed to implement the operator.

The executability information is set to "1" when the interim result is not required, or when the necessary interim result is already created and thus the operator is executable. The executability information is set to "0" when the interim result is required but is yet to be created and thus the operator cannot be implemented. When the operator is already implemented, the executability information is set to "2". The executability information setting is not limited to the above, however, and any method of judging the next executable operator can be adopted.

The executing unit 202 selects the next operator to be executed from among the operators whose executability information shows "1" by referring to the executability table, and executes the operator. If there is no more operator to be executed, the search process is terminated. The interim results remaining on the slave nodes 200 are provided as the final search result.

The executing unit 202 executes processes in relation to various operators that are included in a search plan in correspondence with a search request. The main processes of the executing unit 202 are given below.

To implement the series of operators, the executing unit 202 first causes the DB managing unit 203 (described later) that manages databases to execute a process in relation to data acquisition. Then, the executing unit 202 adds the execution result information of the operators to the interim result data managed by the interim result managing unit 205 (described later).

When the execution of all the operators is completed, the executing unit 202 stores information indicating that the obtained interim results are completed, in an interim result preparation state table. As shown in FIG. 26, the interim result preparation state table stores therein interim result IDs of the completed interim results.

Thereafter, the executing unit 202 updates the executability information on the executability table in accordance with the information updated on the interim result preparation state table. In particular, the executing unit 202 changes the executability information corresponding to the interim result ID that is added to the interim result preparation state table to "2", which represents that the execution is completed.

During the execution of the operators, the process performed by the executing unit 202 is targeted for the interim results managed by the physical DBs 220 and the interim result managing unit 205 on the slave nodes 200. However, when an operator requests a transfer of the interim result, the executing unit 202 performs a process onto the transfer request notifying unit 207.

In the structure of FIG. 10, the DB managing unit 203 executes various data acquiring operations on the physical DBs 220 such as index scanning and database scanning.

The assigning unit 204 assigns a sequence ID to a sequence created as an interim result according to an instruction from the executing unit 202.

The interim result managing unit 205 manages the created interim results. More specifically, the interim result managing unit 205 manages the interim results created in accordance with the execution of the search plan by storing them in a not-shown memory medium such as a RAM. When the interim result is transferred, the interim result managing unit 205 replicates the transferred interim result and stores it in the memory medium.

The interim result transferring unit 206 receives an interim result transfer request from other slave nodes 200 by way of the transfer requesting unit 106 of the master node 100, and transfers the interim result to the slave nodes 200 in accordance with the transfer request.

More specifically, the interim result transferring unit 206 retrieves the receiver slave node information and the interim result ID from the transfer request. By referring to the interim result ID, the interim result transferring unit 206 obtains the interim result that is to be transferred, from the memory medium by way of the interim result managing unit 205. Then, the interim result transferring unit 206 transfers the obtained interim result to the slave node 200 identified by the designated receiver slave node information.

The transfer request notifying unit 207 notifies the transfer requesting unit 106 of the master node 100 of the request for transferring the designated interim result when the operator is to transmit the interim result transfer request.

The structure notifying unit 208 notifies the structure managing unit 107 of the master node 100 of the logical sequence management information including the sequence IDs assigned by the assigning unit 204.

Figure 27A:
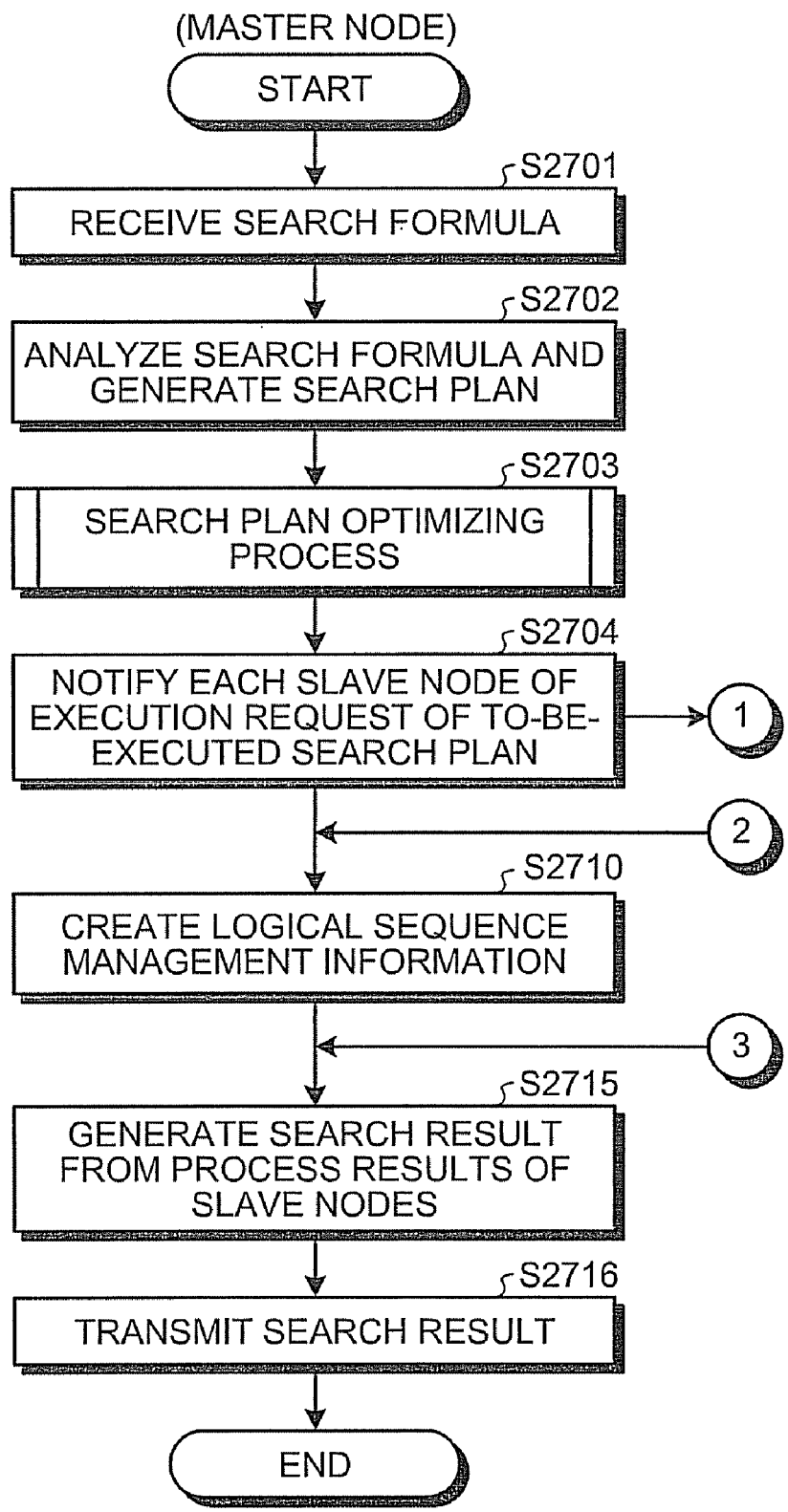
FIGS. 27A and 27B are flowcharts of an entire search process according to the embodiment.
Figure 27B:
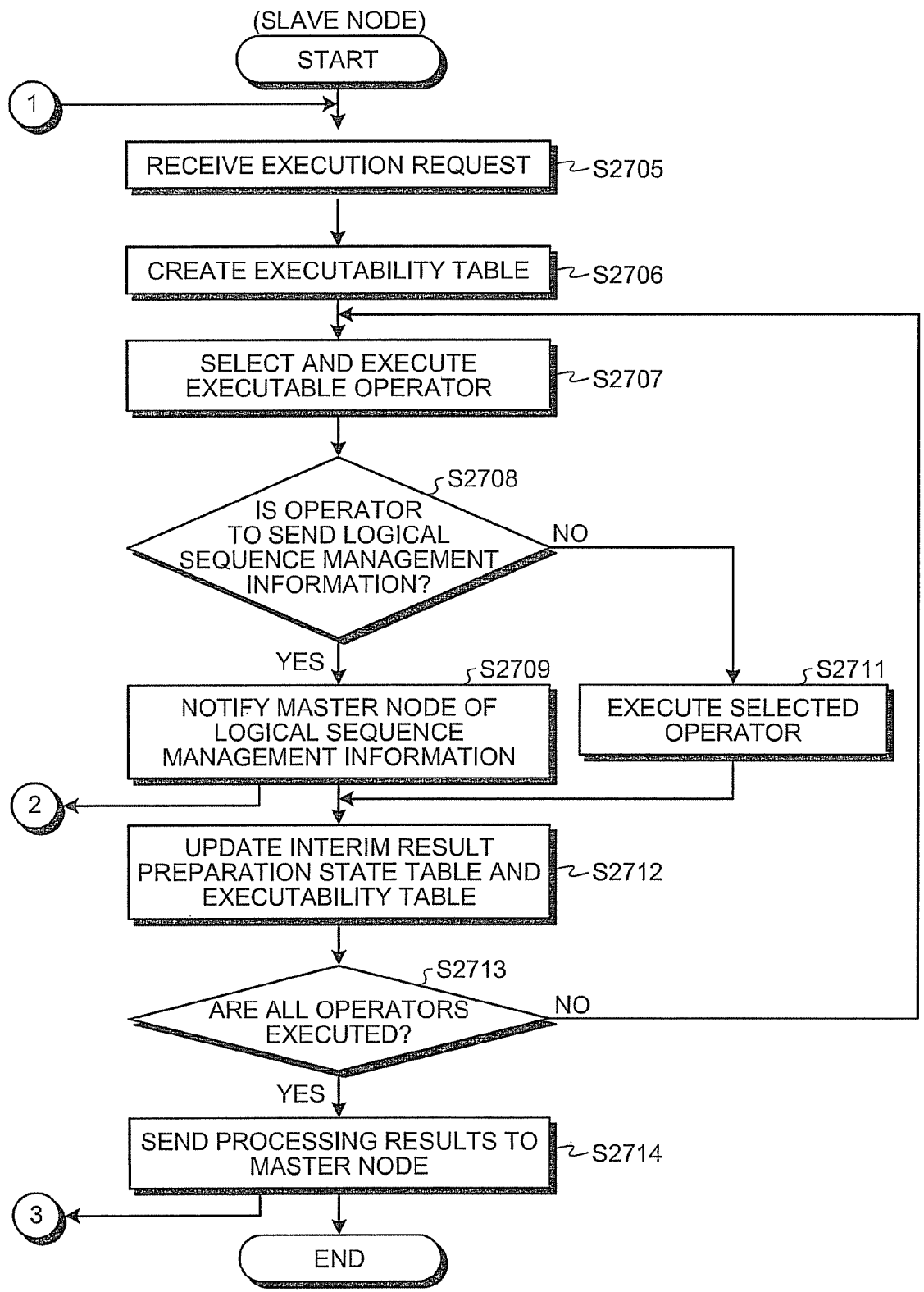

Now, the search process performed by the searching system configured in the above manner according to the embodiment is explained with reference to FIGS. 27A and 27B.

First, the search request receiving unit 101 receives an XQuery search formula as a search request from the client 300 (step S2701). Next, the plan generating unit 102 analyzes the received search formula and generates a search plan (step S2702).

Next, a search plan optimizing process is implemented to optimize the generated search plan by removing an operator for creating unnecessary logical sequence management information from the search plan (step S2703). The details of the search plan optimizing process will be given later.

Then, the execution requestexecution requesting unit 105 notifies each slave node 200 of an execution request of the search plan that is to be implemented (step S2704).

The execution request receiving unit 201 of the slave node 200 receives the execution request (step S2705). Thereafter, the executing unit 202 creates an executability table as indicated in FIG. 25 or 26 by referring to the search plan included in the received execution request (step S2706).

Then, the executing unit 202 determines the executability of each operator by referring to the executability table and selects an executable operator (step S2707).

The executing unit 202 determines whether the operator is to send the logical sequence management information to create a logical sequence (whether it is a "registSequence" operator) (step S2708). When the operator is to send the logical sequence management information (yes at step S2708), the structure notifying unit 208 notifies the master node 100 of the logical sequence management information (step S2709). The logical sequence management structure information notified of by the structure notifying unit 208 includes sequence IDs that are provided by the assigning unit 204 in the process related to the operators that are implemented before.

The structure managing unit 107 of the master node 100 receives the logical sequence management information and adds it to the logical sequence management information on the master node 100 (step S2710).

When it is determined at step S2708 that the operator is not to send the logical sequence management information (no at step S2708), the executing unit 202 executes the selected operator (step S2711). As discussed above, various operators including the transfer of interim results can be executed at this step, but these operators are omitted from the drawing for the sake of simplicity.

Next, the executing unit 202 adds the result of implementing the operator to the interim result preparation state table, and updates the executability information on the executability table (step S2712).

Then, the executing unit 202 determines whether all the operators are implemented by referring to the executability table (step S2713). When the execution of all the operators is not yet completed (no at step S2713), the next operator that is executable is selected and the process is repeated (step S2707).

When the execution of all the operators is completed (yes at step S2713), the executing unit 202 sends the process result to the master node 100 (step S2714).

The result obtaining unit 109 of the master node 100 combines the process results from all the slave nodes 200 to generate a search result (step S2715). Then, the result obtaining unit 109 sends the generated search result to the client 300 (step S2716), and the search process is terminated.

Figure 28:
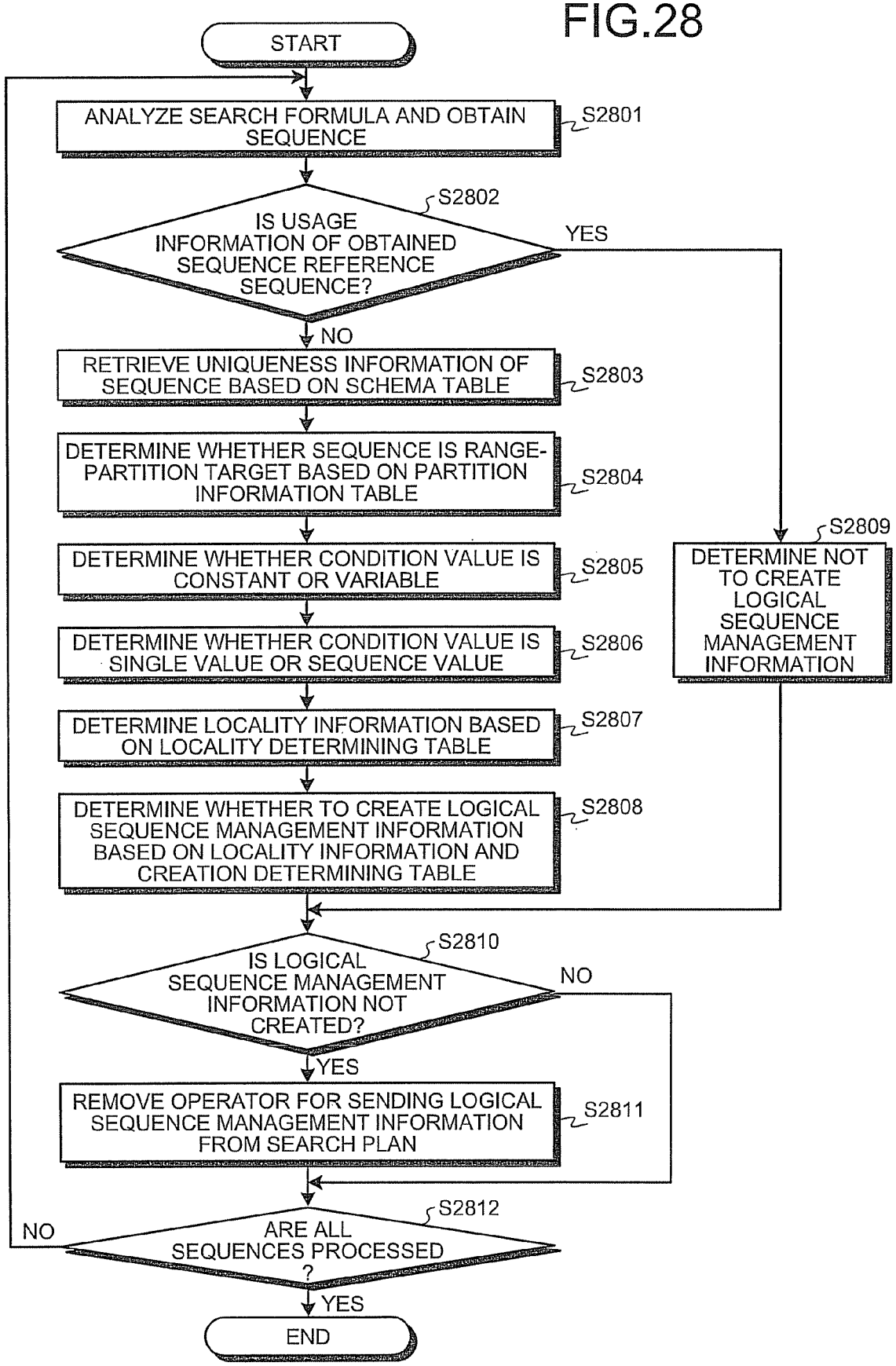
FIG. 28 is a flowchart of an entire search plan optimizing process according to the embodiment.

The details of the search plan optimizing process at step S2703 are given with reference to FIG. 28.

The determining unit 103 analyzes the search formula, and obtains a sequence that is a process result of the operator (step S2801). For instance, from a search formula as provided in FIG. 15, "$a" and "$b" are obtained as a process result of the sequence.

Next, the determining unit 103 determines whether the usage information of the obtained sequence is a reference sequence (step S2802). As discussed above, the determining unit 103 makes determination on the usage information of the sequence by analyzing the exchanges of the values in the search formula. In the example of FIG. 15, the usage information of "$a" and "$b" is determined as a "reference sequence" and an "output sequence", respectively.

When the usage information is not a reference sequence, or in other words, when it is an output sequence (no at step S2802), the determining unit 103 executes a process at steps S2803 through S2808 to determine whether the logical sequence management information should be created by use of the aforementioned determination table.

First, the determining unit 103 retrieves the uniqueness information of the sequence by referring to the schema table 121 (step S2803). Next, the determining unit 103 refers to the partition information table 122, and determines whether the sequence is a range-partition target or a non-range-partition target (step S2804).

Next, the determining unit 103 analyzes the search formula, and determines whether the condition value that is to be compared with the sequence is a constant or a variable (step S2805). The determining unit 103 also determines whether the condition value is a single value or a sequence value (step S2806).

Next, the determining unit 103 makes determination on the locality information by referring to the locality determining table 123, in accordance with the determined data attribute (uniqueness information and information indicating whether it is a range-partition target or a non-range-partition target) and the determined type of condition values (constant/variable and single/sequence value) (step S2807).

Thereafter, the determining unit 103 determines whether to create the logical sequence management information by referring to the determined locality information and the creation determining table 124 (step S2808). For instance, according to the creation determining table 124 as indicated in FIG. 18, when it is determined that the locality information is present, it is determined that the logical sequence management information does not need to be created even if the usage information is an output sequence.

When it is determined at step S2802 that the usage information is a reference sequence (yes at step S2802), the determining unit 103 determines not to create logical sequence management information (step S2809). When the usage information is a reference sequence, the logical sequence does not need to be created for outputting. Thus, it is always determined that the creation of the logical sequence management information is not required.

Next, the updating unit 104 determines whether the creation of the logical sequence management information is determined to be unnecessary (step S2810). When it is determined that the creation is unnecessary (yes at step S2810), the updating unit 104 removes the operator of sending the logical sequence management information for the target sequence of the determination from the search plan, thereby updating the search plan (step S2811).

When it is determined either after updating the search plan or at step S2810 that the creation of the logical sequence management information is not determined to be unnecessary (no at step S2810), the determining unit 103 determines whether the process on all the sequences in the search formula is completed (step S2812).

When the process on all the sequences is not yet completed (no at step S2812), the next sequence to be process is extracted to repeat the process (step S2801). When all the sequences are processed (yes at step S2812), the search plan optimizing process is terminated.

Thus, in the search plan optimizing process, the operator for notifying the master node of the logical sequence management information is removed from the search plan when logical sequence management information does not need to be created. In contrast to the conventional technology in which the operator for notifying the master node of the logical sequence management information is executed on all the sequences as indicated by step S2709 of FIG. 27B, the process according to the embodiment can omit an unnecessary operator and thereby reduce the search processing load.

A concrete example of the search process according to the embodiment is now given. The following example shows that search results that satisfy the search formula can be accurately obtained even when the "registSequence" operator is removed so that the logical sequence management information is not created and thereby the search plan is optimized.

Moreover, it is assumed that the structure of this example is the same as the structure of FIG. 5, that the storage unit 120 of the master node 100 includes tables as shown in FIGS. 11 to 14 as well as judgment tables as shown in FIGS. 17 and 18, and that a search formula as shown in FIG. 15 is input to the structure.

FIGS. 29 to 52, 54 to 60, and 62 to 64 are explanatory diagrams for showing examples of the interim results that are output in this example. FIGS. 53 and 61 are explanatory diagrams for showing examples of the logical sequence management information that are output in this example.

In such a structure, the plan generating unit 102 prepares the optimized search plan as indicated in FIG. 19. Then, according to the prepared search plan, the search process is executed by using the following procedure.

First, the execution request receiving unit 201 of the slave node 1 receives a search plan that is to be executed at the slave node 1 from the execution requestexecution requesting unit 105 of the master node 100.

The slave node 1 represents the slave node 200 of slave node ID=1. In a similar manner, the slave nodes 200 of slave node IDs=2, 3, and 4 are referred to as slave node 2, slave node 3, and slave node 4, respectively.

The executing unit 202 of the slave node 1 receives the search plan from the execution request receiving unit 201. The executing unit 202 prepares an executability table as indicated in FIG. 22 that presents executability conditions by using the interim results of the input as conditions with respect to the operators described in the received search plan. At the same time, an interim result preparation state table is prepared. In the initial state, no interim result is set to the interim result preparation state table. The same process is conducted by the executing units 202 of the slave nodes 2 to 4.

Thereafter, the executing unit 202 of the slave node 1 selects an operator to be executed. At this point, because there is no interim result that is to be input, the "createTable" and "request" operators, which can be executed without condition, are executable. It is assumed here that the executing unit 202 first selects the "request" operator.

The executing unit 202 executes the "request" operator for requesting the transfer of the interim result BT3. Through the execution of the "request" operator, the transfer request notifying unit 207 of the slave node 1 receives a request for executing the transfer request notifying process. The transfer request notifying unit 207 notifies the transfer requesting unit 106 of the master node 100 of the transfer request. The transfer requesting unit 106 of the master node 100 receives the notified transfer request, and stores and manages the transfer request in a management table or the like. In a similar manner, the slave node 2 executes the operator for requesting the transfer of the interim result BT3. The slave nodes 3 and 4 also execute the "request" operator for requesting the transfer of an interim result BT2 by following the same procedure.

Further, the executing unit 202 of the slave node 1 conducts an operator selection, and selects the "createTable" operator. The executing unit 202 executes the "createTable" operator for creating interim results to record the constants given in the search formula, and stores the obtained interim result BT1 by way of the interim result managing unit 205.

In this "createTable" operator, the executing unit 202 executes a process of creating interim results having designated constants. In this example, the constant "12345" is designated in the search formula of FIG. 15. As a result of the operator, the interim result as shown in FIG. 29 is created. The created interim result has one column and one record, and the column value is "12345".

The executing unit 202 adds the BT1 to the interim result preparation state table as the completed interim result. In addition, the executing unit 202 updates the executability information on the executability table to indicate "completed" ("2") based on the information updated on the interim result preparation state table.

By referring to the updated executability table, the executing unit 202 of the slave node 1 selects the "select" operator as an executable operator, and executes the "select" operator. The "select" operator is a process of inputting the value in the column "col1" of the interim result BT1 in FIG. 29, searching for a node that has a value corresponding to the input value "12345" from among "/deal/item/@category" nodes in the "deal" data stored in the "auctions" database, and acquiring the node ID of this node.

The executing unit 202 creates an interim result BT100 anew, and enters the value obtained through the "select" operator into the "category" column for the interim result BT100. The created BT100 is stored by the interim result managing unit 205. As a result of the "select" operator, the interim result as shown in FIG. 30 is provided. Two node IDs, "001" and "002", are obtained as "category" column values. The executing unit 202 stores the interim result BT100 in the interim result preparation state table as a completed interim result. The executing unit 202 updates the executability information on the executability table in accordance with the information updated on the interim result preparation state table.

By referring to the updated executability table, the executing unit 202 of the slave node 1 selects a "scanAncestor" operator as an executable operator, and executes the "scanAncestor" operator. The "scanAncestor" operator is a process of inputting the values of the "category" column of the interim result BT100 in FIG. 30 and acquiring the node IDs of the ancestor nodes of the "/deal/item/@category" nodes indicated by the input values from among the "/deal" nodes of the "deal" data stored in the "auctions" database.

The executing unit 202 creates an interim result BT101 anew, and enters the values obtained through the "scanAncestor" operator into a "deal" column of the interim result BT101. The executing unit 202 stores the newly created interim result BT101 by way of the interim result managing unit 205. As indicated in FIG. 31, the values in the "deal" column, "003" and "004", are obtained as the ancestor nodes of the nodes indicated by the values "001" and "002" in the "@category" column.

The executing unit 202 stores the interim result BT101 in the interim result preparation state table as the completed interim result. The executing unit 202 updates the executability information on the executability table in accordance with the information updated on the interim result preparation state table.

By referring to the updated executability table, the executing unit 202 of the slave node 1 selects a "scanDescendant" operator as an executable operator, and executes the "scanDescendant" operator. The "scanDescendant" operator is a process of using the values in the "deal" column of the interim result BT101 in FIG. 31 as input values and acquiring node IDs of the descendant nodes of the nodes "/deal" indicated by the input values from among the "/deal/related/@category" nodes in the "deal" data stored in the "auctions" database.

The executing unit 202 creates an interim result BT2 anew, and stores the values obtained through the "scanDescendant" operator in a "category2" column of the interim result BT2. The created BT2 is stored by the interim result managing unit 205. As shown in FIG. 32, two values "005" and "006" of the column "category2" are obtained as descendant nodes of the value "003" of the "deal" column, while two values "007" and "008" of the "category2" column are obtained as descendant nodes of the value "004".

The executing unit 202 stores the interim result BT2 in the interim result preparation state table as the completed interim result. The executing unit 202 updates the executability information on the executability table in accordance with the information updated on the interim result preparation state table.

By referring to the updated executability table, the executing unit 202 of the slave node 1 selects a "notify" operator as an executable operator, and executes the "notify" operator. In the "notify" operator, the executing unit 202 notifies the transfer requesting unit 106 of the master node 100 of the interim-result completion notification indicating that the interim result BT2 is in the state of being completed.

The executing unit 202 of the slave node 2 also executes operators in the same manner as the series of processes at the slave node 1. As a result of the "createTable" operator, BT1 is created as shown in FIG. 33. Next, BT100 is created as shown in FIG. 34 by the "select" operator, and then BT101 is created as shown in FIG. 35 by the "scanAncestor" operator. Thereafter, BT2 is created as shown in FIG. 36 by the "scanDescendant" operator. Finally, by the "notify" operator, the executing unit 202 of the slave node 2 notifies the transfer requesting unit 106 of the master node 100 of the interim-result completion notification that indicates the interim result BT2 is in the state of being completed.

Next, the transfer requesting unit 106 of the master node 100 compares all the received interim-result completion notifications with the transfer request notifications to determine executability of the transfer requests. In the example, because the interim results BT2 are already created at the slave nodes 1 and 2, it is determined that the interim results BT2 can be sent to the corresponding slave nodes 3 and 4.

The transfer requesting unit 106 of the master node 100 sends a transfer request to the interim result transferring unit 206 of the transfer-requested slave node 200 storing therein the interim result BT2 that is to be transferred to request the transfer of the interim result. In this example, the transfer requesting unit 106 of the master node 100 sends a transfer request of transferring the interim result BT2 to the receiver slave nodes 200, which are the slave nodes 3 and 4, to the interim result transferring units 206 of the transfer-requested slave nodes 200, which are the slave nodes 1 and 2, storing therein the interim result BT2 that is to be transferred.

The interim result transferring units 206 of the slave nodes 1 and 2 receive the transfer request from the transfer requesting unit 106 of the master node 100. Thereafter, the interim results BT2 are sent to the receiver slave nodes 200, which are the slave nodes 3 and 4 designated by the transfer request.

The interim result transferring unit 206 of the slave node 3, which is the receiver slave node 200 receiving the interim results, creates an interim result BT2 anew. Then, the interim result transferring unit 206 receives the interim results from the slave nodes 1 and 2, which are the transfer-requested slave nodes 200, and sequentially enters the received interim results in the created interim result BT2. At this point, a key ID is prepared for each record and stored in the key ID column of the interim result BT2. After the transfer, the BT2 is completed as indicated in FIG. 37.

As shown in this drawing, the interim result BT2 of the slave node 3 is prepared by merging the values of the interim result BT2 of the slave node 1 (FIG. 32) and the interim result BT2 of the slave node 2 (FIG. 36). The executing unit 202 stores this finally prepared interim result BT2 by way of the interim result managing unit 205. Further, the executing unit 202 sends the completion notification of transferring the interim result BT2 to the executing unit 202 of the received slave node 200. The executing unit 202 stores this interim result BT2 in the interim result preparation state table as the completed interim result. The executing unit 202 updates the executability information on the executability table in accordance with the information updated on the interim result preparation state table.

The slave node 4, which is the slave node 200 on the receiving side, performs the same processes to prepare the interim result BT2 similar to that of FIG. 37.

By referring to the updated executability table, the executing unit 202 of the slave node 3 selects a "Join" operator as an executable operator, and executes the "Join" operator. In the "Join" operator, the values of the "category2" column of the interim result BT2 in FIG. 37 are used as input values. Then, the node values of "/deal/related/@category" nodes indicated by the input values in the "deal" data stored in the "auctions" database are compared with the node values of "/person/profile/interest/@category" nodes in the "person" data stored in the "people" database to acquire the node IDs of the "/person/profile/interest/@category" nodes that agree with the node values of the "/deal/related/@category" nodes indicated by the input values.

The executing unit 202 creates an interim result BT200 anew, and stores the values acquired through the "Join" operator in a column "category3" of the interim result BT200. The executing unit 202 stores this interim result BT200 by way of the interim result managing unit 205. As indicated in FIG. 38, the value "201" is obtained for the "category3" column in correspondence with the value of the "category2" column, "005". In the same manner, two values "202" and "203" are obtained for the "category3" column in correspondence with the value of the "category2" column, "007". Further, two values "204" and "205" are obtained for the "category3" column in correspondence with the value of the "category2" column, "106". There are no values available in the "people" database in correspondence with other values of the "category2" column, "006", "008", "105", "107" and "108".

The executing unit 202 stores the interim result BT200 in the interim result preparation state table as the completed interim result. The executing unit 202 updates the executability information on the executability table in accordance with the information updated on the interim result preparation state table.

By referring to the updated executability table, the executing unit 202 of the slave node 3 selects a "scanAncestor" operator as an executable operator, and executes the "scanAncestor" operator. The "scanAncestor" operator uses the values of the "category3" column of the interim result BT200 shown in FIG. 38 as input values, and acquires the node IDs of the ancestor nodes of the nodes "/person/profile/interest/@category" designated by the input values among the "/person" nodes of the "person" data stored in the "people" database.

The executing unit 202 creates an interim result BT201 anew, and stores the values obtained through the "scanAncestor" operator in the "person" column of the interim result BT201. As a result, the interim result is obtained as indicated in FIG. 39. For example, a value "206" is obtained as the node ID of the ancestor node of the "/person/profile/interest/@category" node designated by a value "201" of the "category3" column. Furthermore, the executing unit 202 stores the BT201 in the interim result preparation state table as the completed interim result. The executing unit 202 updates the executability information on the executability table in accordance with the information updated on the interim result preparation state table.

By referring to the updated executability table, the executing unit 202 of the slave node 3 selects a "scanDescendant" operator as an executable operator, and executes the "scanDescendant" operator. In the "scanDescendant" operator, the values of the "person" column of the interim result BT201 shown in FIG. 39 are used as input values, and the node IDs of descendant nodes of the "/person" nodes designated by the input values are acquired from among the "/person/@id" nodes in the "person" data stored in the "people" database.

The executing unit 202 creates an interim result BT202 anew, and stores the values acquired through the "scanDescendant" operator in the "id" column of the interim result BT202. The executing unit 202 stores the created interim result BT202 by way of the interim result managing unit 205. As a result, the interim result is obtained as shown in FIG. 40. For instance, a value "211" is obtained as the node ID of the descendant node of the "/person" node designated by the value "206" in the "person" column.

The executing unit 202 stores the BT202 in the interim result preparation state table as the completed interim result. The executing unit 202 updates the executability information on the executability table in accordance with the information updated on the interim result preparation state table.

By referring to the updated executability table, the executing unit 202 of the slave node 3 selects a "sequence" operator as an executable operator, and executes the "sequence" operator. In the "sequence" operator, the interim result BT202 of FIG. 40 is used as input values. The records of the input interim result are grouped in such a manner that the records in the same group have the same "key ID" column value, and sequences of "id" column values and the sequence IDs of these sequences are obtained.

More specifically, the executing unit 202 creates an interim result BT3 and an interim result BT1002 anew. The created sequence IDs are entered in the "S(id)" column of the interim result BT3, and the created sequence IDs and the "id" column values that serve as the elements of the sequence IDs are paired up and stored in the "S(id)" and "id" columns of the interim result BT1002. The executing unit 202 further stores the created interim result BT3 and interim result BT1002 by way of the interim result managing unit 205. As a result, the interim results BT3 and BT1002 are obtained as shown in FIGS. 41 and 42. In accordance with FIG. 41, for instance, the sequence IDs of three created sequences are presented as "33411", "33421" and "33431" in the "S(id)" column. In accordance with FIG. 42, the entity of the sequence designated by the sequence ID "33421" is presented as "id" column values "212" and "213". In other words, the sequence of the sequence ID "33421" is formed by these two values.

The sequence ID is obtained by the following procedure. When the "sequence" operator is executed, the executing unit 202 first inputs, as a set of values to the assigning unit 204, the slave node ID of its own, the interim result ID of the interim result of where it is stored, the column number in the interim result, the record number in the interim result, and a locality sequence flag that corresponds to the locality information that shows the local determination result at the time of making the plan. The assigning unit 204 creates a sequence ID in accordance with the format of FIG. 22, and returns the sequence ID to the executing unit 202. Because of the optimization of the plan, the "registSequence" operator would not be implemented.

The executing unit 202 enters the interim result BT3 into the interim result preparation state table as the completed interim result. The executing unit 202 updates the executability information on the executability table in accordance with the information updated on the interim result preparation state table.

By referring to the updated executability table, the executing unit 202 of the slave node 3 selects a "notify" operator as an executable operator, and executes the "notify" operator. The "notify" operator sends an interim-result completion notification indicating that the interim result BT3 is completed to the transfer requesting unit 106 of the master node 100.

The executing unit 202 of the slave node 4 follows the same procedure for the series of processes as in the slave node 3 to implement the operators. The same BT2 as in FIG. 37 is created on the slave node 4 by implementing a transfer. Then, BT200 is created as shown in FIG. 43 as a result of the "Join" operator. Thereafter, BT201 is created as shown in FIG. 44 as a result of the "scanAncestor" operator. As a result of the following "scanDescendant" operator, BT202 is created as shown in FIG. 45. Then, BT3 and BT1002 are created as shown in FIGS. 46 and 47, respectively, as a result of the "sequence" operator. Thereafter, as a result of the "notify" operator, an interim-result completion notification indicating that the interim result BT3 is completed is sent to the transfer requesting unit 106 of the master node 100.

The transfer requesting unit 106 of the master node 100 compares all the received interim-result completion notifications and the transfer request notifications to determine executable transfer requests. Because the interim results BT3 are already prepared at the slave nodes 3 and 4, it can be determined that the interim results BT3 may be transferred to the slave nodes 1 and 2.

To request a transfer of the interim result, the transfer requesting unit 106 of the master node 100 notifies the interim result transferring unit 206 of the transfer-requested slave node 200 storing therein the interim result BT3 that is to be transferred of a transfer request. In particular, the transfer requesting unit 106 of the master node 100 requests that interim result transferring units 206 of the transfer-requested slave nodes 200 storing therein the interim result BT3 that is to be transferred, which are the slave nodes 3 and 4, transfer the interim result BT3 to the receiving slave nodes 200, which are the slave nodes 1 and 2.

The interim result transferring units 206 of the slave nodes 3 and 4 receive a transfer request from the transfer requesting unit 106 of the master node 100. Thereafter, the interim result BT3 is transferred to the receiving slave nodes 200 designated by the transfer request, which are the slave nodes 1 and 2.

The interim result transferring unit 206 of the slave node 1, which is a receiving slave node 200, creates an interim result BT3 anew. Then, the interim result transferring unit 206 receives the interim results from the transfer-requested slave nodes 200, which are the slave nodes 3 and 4, and sequentially adds the received interim results into the interim result BT3. As a result of the transfer, the BT3 is completed as shown in FIG. 48.

In the created interim result BT3 of the slave node 1, the values in the interim result BT3 of the slave node 3 (FIG. 41) and the interim result BT3 of the slave node 4 (FIG. 46) are merged. The executing unit 202 stores the finally created interim result BT3 into the interim result managing unit 205. Furthermore, the executing unit 202 of the slave node 1 notifies the executing unit 202 of the received slave node 200 of a transfer completion notification of transferring the interim result BT3. The executing unit 202 stores the interim result BT3 in the interim result preparation state table as the completed interim result. The executing unit 202 also updates the executability information on the executability table in accordance with the information updated on the interim result preparation state table.

A similar process is performed on the slave node 2, which is another receiving slave node 200, where the interim result BT3 similar to that of FIG. 48 is created.

By referring to the updated executability table, the executing unit 202 of the slave node 1 selects a "Join" operator as an executable operator, and executes the "Join" operator. In the "Join" operator, the "S(id)" column values of the interim result BT3 in FIG. 48 are used as input values. The node values of the "/person/@id" nodes designated by the input values in the "person" data stored in the "people" database are compared with the node values of "/deal/@buyer" nodes in the "deal" data stored in the "auctions" database to acquire the node IDs of the "/deal/@buyer" nodes that agree with the node values of the "/person/@id" nodes designated by the input values.

The executing unit 202 creates an interim result BT300 anew, and stores the values acquired through the "Join" operator in the "person" column of the interim result BT300. The executing unit 202 further stores the created interim result BT300 by way of the interim result managing unit 205. As a result, the interim result as shown in FIG. 49 is obtained. According to this drawing, for example, "401" and "402" are obtained as "person" column values in correspondence with a "S(id)" column value, "33411".

The executing unit 202 stores the interim result BT300 in the interim result preparation state table as the completed interim result. The executing unit 202 updates the executability information on the executability table in accordance with the information updated on the interim result preparation state table.

By referring to the updated executability table, the executing unit 202 of the slave node 1 selects a "scanAncestor" operator as an executable operator, and executes the "scanAncestor" operator. In the "scanAncestor" operator, the values of the column "person" of the interim result BT300 shown in FIG. 49 are used as input values, and the node IDs of the ancestor nodes of "/deal/@buyer" nodes designated by the input values are acquired from among the "/deal" nodes of the "deal" data stored in the "auctions" database.

The executing unit 202 creates an interim result BT301 anew, and stores the values obtained through the "scanAncestor" operator in the "deal" column of the interim result BT301. As a result, the interim result as shown in FIG. 50 is obtained. The executing unit 202 stores the BT301 as the completed interim result in the interim result preparation state table. The executing unit 202 updates the executability information on the executability table in accordance with the information updated on the interim result preparation state table.

By referring to the updated executability table, the executing unit 202 of the slave node 1 selects the "sequence" operator as an executable operator, and executes the "sequence" operator. In the "sequence" operator, the interim result BT301 in FIG. 50 is used as input values. The records of the input interim result are grouped in such a manner that the records in the same group have the same "key ID" column value, thereby finding sequences having "deal" column values and the sequence IDs of these sequences.

The executing unit 202 creates an interim result BT0 and an interim result BT1004 anew. The executing unit 202 stores the created sequence IDs in the "S(deal)" column of the interim result BT0, and also pairs up and stores the created sequence IDs and the "deal" column values serving as the elements of the sequence IDs in the "S(deal)" and "deal" columns of the interim result BT1004.

The executing unit 202 further stores the created interim results BT0 and BT1004 by way of the interim result managing unit 205. As a result, the interim results as shown in FIGS. 51 and 52 are obtained. In FIG. 51, for instance, "S(deal)" column values, "10110", "10120", and "10130" are obtained as the sequence IDs of the three created sequences.

According to FIG. 52, the "deal" column values, "406" and "407", are obtained as the entity of the sequence of the sequence ID "10110", for instance. The sequence of the sequence ID "10110" is formed of these two values. The executing unit 202 stores the interim result BT0 in the interim result preparation state table as the completed interim result. The executing unit 202 also updates the executability information on the executability table in accordance with the information updated on the interim result preparation state table.

By referring to the updated executability table, the executing unit 202 of the slave node 1 selects the "registSequence" operator as an executable operator, and executes the "registSequence" operator. In the "registSequence" operator, the executing unit 202 sends the logical sequence management information about the S(deal) attributes that is stored in the interim result BT0 to the structure notifying unit 208. The structure notifying unit 208 transfers the received logical sequence management information to the structure managing unit 107 of the master node 100. The structure managing unit 107 of the master node 100 adds the received logical sequence management information to a logical sequence structure management table indicated in FIG. 53.

For instance, the logical sequence management information of the sequence designated by the first "S(deal)" column value of the BT0 in FIG. 51 is determined as (10110, 1, 1004, 111). This corresponds to the first record of the logical sequence management information in FIG. 53.

In the same manner as the series of processes at the slave node 1, the executing unit 202 of the slave node 2 executes the operators. When the transfer is implemented, a BT3 similar to that of FIG. 48 is created on the slave node 2. When the "Join" operator is executed, a BT300 as shown in FIG. 54 is created. As a result of the following "scanAncestor" operator, a BT301 as shown in FIG. 55 is created. Then, as a result of the "sequence" operator, a BT0 and a BT1004 as shown in FIGS. 56 and 57, respectively, are created. When the "registSequence" operator is executed, the logical sequence management information on the interim result BT0 is transferred to the structure managing unit 107 of the master node 100. The structure managing unit 107 of the master node 100 adds the transferred logical sequence management information to the logical sequence structure management table as shown in FIG. 53.

As a result of the execution of the entire search plan, the interim results BT0 shown in FIGS. 58 and 59 obtained from the database search are maintained in the interim result managing units 205 of the slave nodes 1 and 2, respectively. In addition, the logical sequence structure management table shown in FIG. 53 that indicates the structures of sequences running across different slave nodes 200 is maintained in the structure managing unit 107 of the master node 100.

After the execution of the search plan, the slave nodes 1 and 2 send the finally obtained interim results BT0 to the corresponding interim result transferring unit 206, from which the interim results BT0 is transferred to the master node 100. The interim result managing unit 108 of the master node 100 receives the interim results from these slave nodes 200, merges them into an interim result BT0 of the master node 100 as indicated in FIG. 60. The interim result BT0 is then stored.

When finally returning the search result, the "S(deal)" column value (sequence value) corresponding to the search result "$b" is obtained in accordance with the following procedure.

After the execution of the search plan, the result obtaining unit 109 of the master node 100 extracts an sequence ID from the "S(deal)" column of the interim result BT0 as indicated in FIG. 60. By referring to the locality sequence flag of the extracted value (a number whose last digit is 0), the result obtaining unit 109 determines that the value is a logical sequence with no locality. The result obtaining unit 109 extracts, by using the extracted sequence ID as a key, the logical sequence management information from the logical sequence structure management table managed by the structure managing unit 107 so that the entities of partial sequences that form the logical sequence can be obtained.

For instance, when the "S(deal)" column value is "10110", "1" is obtained as the corresponding logical sequence ID by referring to partial sequence IDs in the logical sequence management information. FIG. 61 is a table for showing an example of the logical sequence management information obtained in this manner. The result obtaining unit 109 obtains the slave node ID of the node in which the partial sequence forming the logical sequence is present and the interim result ID from the logical sequence management information, and sends a transfer request of the interim result to the transfer requesting unit 106.

The transfer requesting unit 106 notifies the suitable slave node 200 of the interim result ID and the sequence ID and requests a transfer of the interim result. The interim result transferring unit 206 of the slave node 200 that receives the request of transferring the interim result from the transfer requesting unit 106 transfers the requested interim result to the interim result managing unit 108 of the master node 100. The interim result transferred by the slave node 1 may be an interim result BT1006 as indicated in FIG. 62. The interim result transferred by the slave node 2 may be an interim result BT1007 as indicated in FIG. 63.

Figures 63, 64, 65, 66:

The interim result managing unit 108 of the master node 100 merges the received interim results into an interim result BT1008 as indicated in FIG. 64 and stores therein the created interim result. The result obtaining unit 109 obtains the values of the "/deal" nodes that form the logical sequence ID "1", as the "deal" column values of the interim result BT1008 of FIG. 64.

As explained above, a search result can be accurately obtained from a search plan that is optimized in such a manner as not to implement a "registSequence" operator. More specifically, the method according to the embodiment allows the search plan, when it is not necessary to create logical sequence management information, to be optimized by excluding the process of creating the information, and overhead can be thereby reduced in the search process.

Moreover, a case in which the search plan is modified in a manner to skip the "registSequence" operator although the "registSequence" operator cannot be omitted is considered. In such a case, the search result cannot be accurately obtained. In the following, it is assumed that a search formula as shown in FIG. 65 is input.

FIG. 66 is an explanatory diagram for showing an example of a search plan that is supposed to be implemented. FIG. 67 is an explanatory diagram for showing an example of a search plan that is modified in a manner to skip the "registSequence" operator. FIGS. 68 to 74 are explanatory diagrams for showing examples of interim results that are output in this plan.

Figures 74, 75:
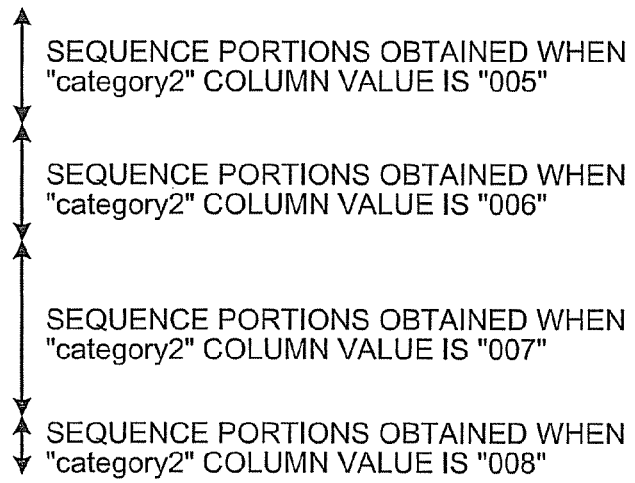

FIG. 75 is an explanatory diagram for showing an example of the logical sequence management information that is output in this plan.

In the search formula of FIG. 65, because the sequence "$a" is an output sequence that is a finally output result, the search plan in relation to the sequence "$a" cannot be modified to skip the "registSequence" operator.

In FIG. 67, a series of operators are executed at each slave node 200 in the same procedures of the search plan according to FIG. 19, up to the operator for outputting a BT3. From the slave node 3, an interim result BT3 as shown in FIG. 68 is output. From the slave node 4, an interim result BT3 as shown in FIG. 69 is output.

The interim results BT3 of FIGS. 68 and 69 that are obtained as the result of the search plan are maintained in the interim result managing units 205 of the slave nodes 3 and 4, respectively. After executing the entire search plan, the slave nodes 3 and 4 send the finally obtained interim results BT3 to the corresponding interim result transferring units 206, from which the interim results are transferred to the master node 100.

The interim result managing unit 108 of the master node 100 receives the interim results from the slave nodes 200, merges them into an interim result BT3 of the master node 100 as shown in FIG. 70, and stores it by way of the interim result managing unit 205.

When finally returning the search result, a "S(id)" column value (sequence value) that corresponds to the search result "$a" is acquired in accordance with the following procedure.

After the search plan is completed, the result obtaining unit 109 of the master node 100 extracts a sequence ID from the "S(id)" column of the interim result BT3 as shown in FIG. 70. The result obtaining unit 109 determines that the sequence is a logical sequence with locality, based on the locality sequence flag of the extracted value (the last digit ending in 1).

Then, the result obtaining unit 109 obtains the slave node 200 in which a partial sequence forming the sequence is present and the interim result ID on the basis of the sequence ID, and sends a transfer request of the interim result to the transfer requesting unit 106. For instance, when the value of the "S(id)" column is "33411", the result obtaining unit 109 determines, by use of the format of the sequence ID as shown in FIG. 22, that the sequence is present in the BT3 of the slave node 3.

The transfer requesting unit 106 notifies the corresponding slave node 200 of the interim result ID and the sequence ID and requests the transfer of the interim result. The interim result transferring unit 206 of the slave node 200 that receives the transfer request of the interim result from the transfer requesting unit 106 transfers the requested interim result to the interim result managing unit 108 of the master node 100. The interim result transferred by the slave node 3 is described as an interim result BT1002 in FIG. 71, for example. The interim result transferred by the slave node 4 is described as an interim result BT1002 in FIG. 72, for example.

When receiving the interim result, the interim result managing unit 108 of the master node 100 creates and stores an interim result BT1004 as shown in FIG. 73. The result obtaining unit 109 obtains, as an "id" column value of the interim result BT1004 of FIG. 73, a value of a "/person/@id" node that forms the sequence ID "33411".

The search result obtained at this step is incorrect, however. The interim results BT202 of FIGS. 40 and 45 obtained by the different slave nodes 200 through the "scanDescendant" operator implemented before the operator for obtaining the BT3 are supposed to be logically a single result, as indicated in FIG. 74. For this reason, when the value of the "category2" column (=$x) is, for example, "005", the value of the sequence "S(id)" column that is obtained therefrom should logically be a sequence of two "id" column values as shown in FIG. 75. On the other hand, according to FIG. 73, the obtained "id" column value is "211" only.

In other words, if the plan is modified to exclude the "registSequence" operator although the condition of excluding the "registSequence" operator is not satisfied, the process would lead to an incorrect result. To put it differently, a search plan according to the embodiment can be suitably optimized because the locality and usage of a sequence are checked in advance. This enables an unnecessary process to be omitted, the processing load to be reduced, and an accurate search result to be produced.

In the searching system according to the embodiment, it is determined whether a sequence obtained from a distributed-database search is stored in a single physical DB 220 and whether such a sequence is output as a search result. When either one of the conditions is satisfied, the search plan can be optimized in a manner not to include a process of forming a logical sequence. Thus, a load of processing the sequence during a distributed-database search can be reduced.

Figure 76:
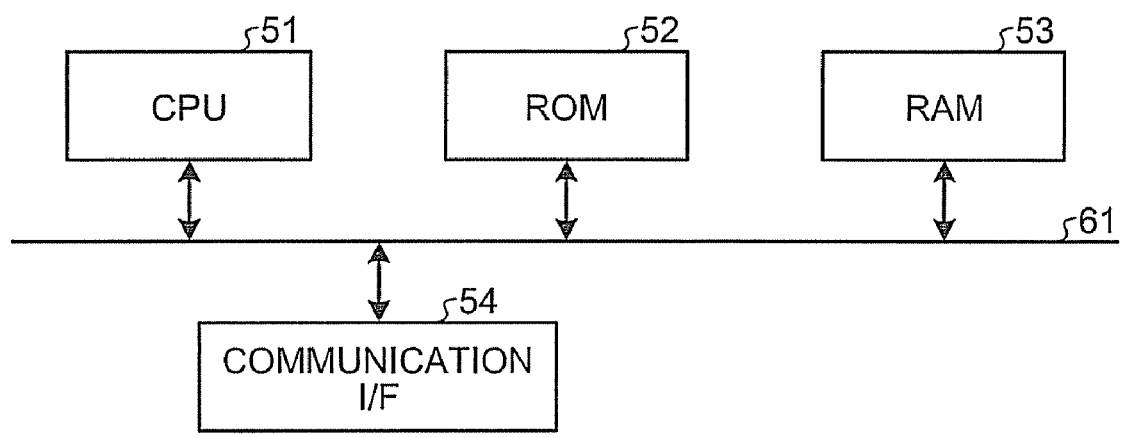
FIG. 76 is an explanatory diagram for showing a hardware structure for the master node and the slave nodes according to the embodiment.

The hardware structure of the master node and the slave node according to the embodiment is explained with reference to FIG. 76.

The master node and the slave node according to the embodiment each comprise a controlling device such as a central processing unit (CPU) 51, memory devices such as a read only memory (ROM) 52 and a RAM 53, a communication interface 54 connected to a network to perform communication, an external memory device such as a hard disk drive (HDD) and a compact disk (CD) drive, a displaying device such as a display, an input device such as a keyboard and a mouse, and a bus 61 that connect all these components. A hardware structure incorporating a regular computer can be adopted.

Programs implemented by the master node and the slave node according to the embodiment are stored as files of an installable or executable format on a computer-readable memory medium such as a compact disk read only memory (CD-ROM), a flexible disk (FD), a compact disk recordable (CD-R), and a digital versatile disk (DVD).

Programs implemented by the master node and the slave node according to the embodiment may be stored on a computer that is connected to a network such as the Internet and offered by downloading via the network. Furthermore, the programs implemented by the master node and the slave node according to the embodiment may be offered or distributed via a network such as the Internet.

The programs according to the embodiment may be stored and provided in advance on a ROM or the like.

A program implemented on the master node and slave node according to the embodiment is structured as a module that includes the aforementioned units ("a search request receiving unit, a plan generating unit, a determining unit, an updating unit, an execution requestexecution requesting unit, a transfer requesting unit, a structure managing unit, an interim result managing unit, and a result obtaining unit" or "an execution request receiving unit, an executing unit, a DB managing unit, an assigning unit, an interim result managing unit, an interim result transferring unit, a transfer request notifying unit, and a structure notifying unit"). As an actual hardware structure, when the CPU 51 (processor) reads programs from the memory medium, these units are loaded on the main memory device and produced thereon.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A searching system comprising:
a plurality of information managing apparatuses, each of the information managing apparatuses managing one of a plurality of databases, the plurality of databases storing information in a distributed manner, the information including at least an item; and
a searching apparatus that searches for the information from the information managing apparatuses, the plurality of information managing apparatuses and the searching apparatus being connected to one another by way of a network; wherein
the searching apparatus includes:
a search request receiving unit that receives a search request including a condition that the item should meet;
a locality storing unit that stores a data attribute of the item, stores a type of the condition, and stores locality information in association with one another, the locality information indicating whether the item is distributed across the databases;
a plan generating unit that analyzes the search request received by the search request receiving unit, and generates a search plan including a request of creating a logical sequence by merging pieces of sequence information and a plurality of requests of obtaining one of the pieces of the sequence information, each piece of the sequence information including the item in a list structure;
a determining unit that obtains from the locality storing unit the locality information that corresponds to the data attribute of the item included in the each piece of the sequence information and the type of the condition that the item included in the each piece of the sequence information should meet, and determines whether the item included in the each piece of the sequence information is distributed across the databases in accordance with the obtained locality information;
an updating unit that removes the request of creating the logical sequence from the search plan and thereby updates the search plan, when the determining unit determines that the item is not distributed across the databases;
an execution requesting unit that sends an execution request of the search plan updated by the updating unit to the information managing apparatuses; and
a result obtaining unit that receives an execution result of the search plan from the information managing apparatuses as a search result, and
each of the information managing apparatuses includes:
an execution request receiving unit that receives the execution request from the searching apparatus; and
an executing unit that executes the search plan in accordance with the execution request received by the execution request receiving unit.

2. The system according to claim 1, wherein the determining unit further determines, by analyzing the search request, whether the sequence information is output as a search result in response to the search request, and the updating unit removes from the search plan the request of creating the logical sequence, and thereby updates the search plan, when the determining unit determines that the sequence information is not output as the search result.

3. The system according to claim 1, further comprising:
a uniqueness storing unit that stores the item and stores uniqueness information, in association with each other, the uniqueness information indicating whether the item takes on a unique value in the databases; and
a partition information storing unit that stores partition information that specifies items to be used as judgment criteria for storing the information in a distributed manner across the databases, wherein
the locality storing unit stores the data attribute including the uniqueness information and the partition information, the types of conditions, and the locality information, in association with one another, and
the determining unit obtains the uniqueness information that corresponds to each item included in the each piece of the sequence information from the uniqueness storing unit, obtains the partition information that corresponds to each item included in the each piece of the sequence information from the partition information storing unit, obtains the locality information that corresponds to the data attribute including the obtained uniqueness information and the obtained partition information and the type of condition that the item should meet from the locality storing unit, and determines whether the item included in the each piece of the sequence information is stored in the distributed manner across the databases, based on the obtained locality information.

4. The system according to claim 3, wherein the locality storing unit stores the locality information indicating that the item included in the each piece of the sequence information is stored in a distributed manner across the databases, in association with the data attribute including the uniqueness information indicating that the item does not take on a unique value in the databases and the partition information indicating that the item included in the each piece of the sequence information is not used as a judgment criterion.

5. The system according to claim 3, wherein the locality storing unit stores the locality information indicating that the item included in the each piece of the sequence information is not stored in a distributed manner across the databases, in association with the data attribute that includes the uniqueness information indicating that the item takes on a unique value in the databases and the type of condition indicating that the sequence information is compared with a single value.

6. The system according to claim 3, wherein the locality storing unit stores the locality information indicating that the item included in the each piece of the sequence information is not stored in a distributed manner across the databases, in association with the data attribute including the partition information indicating that the item included in the each piece of the sequence information is used as the judgment criterion and the type of condition indicating that the sequence information is compared with a single value.

7. The system according to claim 3, wherein the locality storing unit stores the locality information indicating that the item included in the each piece of the sequence information is stored in a distributed manner across the databases, in association with the data attribute including the partition information indicating that the item included in the each piece of the sequence information is not used as the judgment criterion and the type of condition indicating that the sequence information is compared with a sequence value.

8. A searching method in a searching system that includes a plurality of information managing apparatuses, and a searching apparatus that searches for information across the information managing apparatuses, the plurality of information managing apparatuses and the searching apparatus being connected to one another by way of a network, each of the information managing apparatuses managing one of a plurality of databases, the plurality of databases storing the information in a distributed manner, the information including at least one item, the searching method comprising:

storing by the searching apparatus in a locality storing unit, a data attribute of the item, a type of a condition that the item should meet, and locality information in association with one another, the locality information indicating whether the item is distributed across the databases;

receiving a search request including the condition by the searching apparatus;

analyzing the received search request by the searching apparatus;

generating by the searching apparatus a search plan including a request of creating a logical sequence by merging pieces of sequence information and a plurality of requests of obtaining one of the pieces of the sequence information, each piece of the sequence information including the item in a list structure;

obtaining by the searching apparatus from the locality storing unit the locality information that corresponds to the data attribute of the item included in the each piece if the sequence information and the type of the condition that the item included in the each piece of the sequence information should meet;

determining by the searching apparatus whether the item included in the each piece of the sequence information is distributed across the databases in accordance with the obtained locality information;

removing by the searching apparatus the request of creating the logical sequence from the search plan and thereby updating the search plan when the searching apparatus determines that the item is not distributed across the databases;

sending an execution request of the updated search plan to the information managing apparatuses by the searching apparatus;

receiving the execution request from the searching apparatus by the information managing apparatuses; and executing the search plan in accordance with the received execution request by the information managing apparatuses.

9. A searching apparatus that is connected to a plurality of information managing apparatuses by way of a network, each of the information managing apparatuses managing one of a plurality of databases, the plurality of databases storing information in a distributed manner, each of the information including at least one item, the searching apparatus comprising:

a search request receiving unit that receives a search request including a condition that the item should meet;

a locality storing unit that stores a data attribute of the item, stores a type of the condition, and stores locality information in association with one another, the locality information indicating whether the item is distributed across the databases;

a plan generating unit that analyzes the search request received by the search request receiving unit, and generates a search plan including a request of creating a logical sequence by merging pieces of sequence information and a plurality of requests of obtaining one of the pieces of the sequence information, each piece of the sequence information including the item in a list structure;

a determining unit that obtains from the locality storing unit the locality information that corresponds to the data attribute of the item included in the each piece of the sequence information and the type of the condition that the item included in the each piece of the sequence information should meet, and determines whether the item included in the each piece of the sequence information is distributed across the databases in accordance with the obtained locality information;

an updating unit that removes the request of creating the logical sequence from the search plan and thereby updates the search plan, when the determining unit determines that the item is not distributed across the databases; and an execution requesting unit that sends an execution request of the search plan updated by the updating unit to the information managing apparatuses.

* * * * *